US012686046B2

(12) United States Patent
Bustinza

(10) Patent No.: US 12,686,046 B2
(45) Date of Patent: Jul. 21, 2026

(54) DEFORMATION OF THIN WALLED BODIES BY REGISTERED SHAPING

(71) Applicant: Envases (UK) Limited, Port Talbot (GB)

(72) Inventor: Begona Bustinza, Álava (ES)

(73) Assignee: Envases (UK) Limited, Port Talbot (GB)

( * ) Notice: Subject to any disclaimer, the term of this patent is extended or adjusted under 35 U.S.C. 154(b) by 0 days.

(21) Appl. No.: 18/427,196

(22) Filed: Jan. 30, 2024

(65) Prior Publication Data

US 2024/0165690 A1 May 23, 2024

Related U.S. Application Data

(62) Division of application No. 16/620,487, filed as application No. PCT/GB2018/051565 on Jun. 8, 2018, now Pat. No. 11,919,063.

(30) Foreign Application Priority Data

Jun. 8, 2017 (GB) ...................................... 1709167

(51) Int. Cl.

*B44B 5/00* (2006.01)
*B21D 51/26* (2006.01)
*B65D 1/02* (2006.01)

(52) U.S. Cl.

CPC ........ *B21D 51/2607* (2013.01); *B44B 5/0004* (2013.01); *B65D 1/0223* (2013.01); *B65D 2501/0081* (2013.01)

(58) Field of Classification Search

CPC ............ B21D 51/2607; B21D 51/2646; B44B 5/0004; B65D 1/0223; B65D 2501/0081; B65D 1/02

See application file for complete search history.

(56) References Cited

U.S. PATENT DOCUMENTS 2,955,556 A 10/1960 Roper et al.
6,338,263 B1 1/2002 Obata et al.
(Continued)

FOREIGN PATENT DOCUMENTS

WO WO-0158618 A1 * 8/2001 ............. B21D 15/06

*Primary Examiner* — Christopher E Mahoney
*Assistant Examiner* — Marissa Ferguson-Samreth
(74) *Attorney, Agent, or Firm* — Kilpatrick Townsend & Stockton LLP

(57) ABSTRACT

A machine for shaping an initially tubular cylindrical preform 1 to form a non-round shape in registration with printed or similarly applied surface decoration or the like on the preform, comprises: a conveyor (3, FIG. 3) for carrying a series of the preforms; a tool table 6 having a plurality of tool stations 7, 9 between which the preforms are conveyed by indexed motion of the conveyor, the tool table being reciprocable along an axis towards and away from the conveyor, to bring forming tools 11 at the tool stations into and out of operative engagement with the preforms; a registered shaping tool 11 at at least one of the tool stations operatively arranged to deform the preforms to an out-of-round shape; at least one sensor 118, 124, (128, 126, 130, 132) operatively arranged to determine the angular orientation of each preform in a plane normal to the reciprocation axis; at least one reorientation actuator (A1, A2, B1, B2, C, D, E), F1, F2, G operatively arranged to cause relative rotation between each preform and the registered shaping tool, whereby the registered shaping tool and the preforms are brought into a predetermined relative angular orientation about an axis of the preform at the registered shaping tool station; the relative rotation with respect to a given preform taking place during a plurality of reciprocations of the tool table and/or indexing movements of the conveyor. Improved embossing/debossing tools are also disclosed (FIGS. 8*a*-23).

35 Claims, 12 Drawing Sheets

(56) References Cited

U.S. PATENT DOCUMENTS

| | | | | |
|---|---|---|---|---|
| 6,868,652 | B2 | 3/2005 | Arends et al. | |
| 7,004,000 | B2 | 2/2006 | Campo et al. | |
| 7,568,369 | B2 * | 8/2009 | Kubacki | B21D 51/26 72/58 |
| 7,578,158 | B2 | 8/2009 | Frattini | |
| 7,726,165 | B2 * | 6/2010 | Myers | B21D 51/2638 72/348 |
| 8,584,502 | B2 * | 11/2013 | Aichele | B21D 51/2615 72/405.09 |
| 9,327,338 | B2 * | 5/2016 | Boysel | B21D 51/2638 |
| 2003/0074946 | A1 | 4/2003 | Campo et al. | |
| 2015/0174638 | A1 | 6/2015 | Anguera et al. | |

* cited by examiner

DEFORMATION OF THIN WALLED BODIES BY REGISTERED SHAPING

CROSS REFERENCE TO RELATED APPLICATIONS

The present application is a division of U.S. patent application Ser. No. 16/620,487, filed Dec. 7, 2019, which is a national phase application of International Application No. PCT/GB2018/051565 filed Jun. 8, 2018, which claims priority to and filing benefit of United Kingdom Patent Application No. 1709167.9 filed Jun. 8, 2017. The contents of each of these applications is incorporated by reference in their entireties.

This invention concerns processes and machines for deforming thin walled tubular bodies, and while not limited to any specific material, is particularly although not exclusively useful in deforming aluminium alloy preforms for containers, and similar items.

A wide range of products, e.g. deodorants and other personal hygiene and grooming products, pharmaceuticals, foods, beverages and even car valeting, household cleaning and polishing products, garden and domestic insecticides, paints and the like, are to an ever increasing extent being packaged in containers formed from aluminium monobloc preforms. These are impact extruded, drawn wall ironed (DWI), or shaped by any other suitable method, to have a closed bottom end and a cylindrical side wall. The open top end of the preform is then shaped and optionally trimmed in a so-called necking machine, to form a neck profile to which a dispensing valve or other closure or dispensing fitment can be fitted. Prior to such shaping, the outside of the preform is painted and/or overprinted with trade dress and product information, and the inside may be coated for compatibility with the contents. To provide for better product differentiation, increased attractiveness to the consumer, and/or improved ergonomics, selected regions of the preform side wall may be pressed outward (embossed), pressed inward (debossed), or otherwise permanently deformed to a non-round shape. Often there is a need to align this selective shaping with the painted/overprinted trade dress. These aligned shaping processes are collectively referred to herein as “registered shaping” (or in the specific cases of aligned embossing/debossing, “registered embossing”).

WO01/58618, EP1214991 and EP1214994 disclose registered embossing carried out using suitably modified necking machines. This is arrangement is efficient; as it does not slow production rates compared to the manufacture of un-embossed containers, and does not add significantly to factory staffing or floor space requirements. The disclosed necking machines include a rotary table for conveying a series of the preforms in steps through the machine. The preforms are carried by the rotary table with their bases inserted into a series of holders spaced apart at the step interval around the circumference of the rotary table. A reciprocating tool table has a number of necking tool stations in alignment with the open ends of preforms carried by the rotary table. As the rotary table is indexed, the tool table is reciprocated towards and away from it at each stationary step. Each tool on the tool table along the conveying direction is arranged to perform a successive rolling/shaping/cutting operation, simultaneously at each reciprocation (i.e. the tools work together in parallel; but in succession as far as an individual preform is concerned, as it is indexed from one tool station to the next). In this way, the open end of each preform is shaped to form the required neck profile.

Other parts of each preform may be shaped to a different, but still circular, cross-sectional profile by similar tools in this sequence, in the same way.

The tool table is provided with a registered embossing tool station. Here an embossing tool is brought into and out of operative engagement with each successive preform held by the rotary table, by each successive reciprocation of the tool table. In WO01/58618, EP1214991 and EP1214994 the registered embossing tool station is shown positioned upstream of the necking tools; although this is not critical, so long as suitable access to the container interior by the embossing tool remains. To properly perform the registered embossing, the printing, graphics or trade dress on the outside of the preform (hereafter “printing”, for short) must be properly aligned with the embossing tool. No such alignment is required in a standard necking machine, because all transverse cross-sections of the preform remain circular. In these standard machines, the preforms are therefore supplied to and held in the rotary table with the printing in random orientations. In WO01/58618, EP1214991 and EP1214994, the necking machines are accordingly further adapted: either to provide for controlled rotation of the embossing tool for alignment with the printing; or to provide for controlled rotation of each preform for alignment of its printing with the embossing tool. Such controlled rotation of the preform is carried out by rotation of the containers in the holders, or by rotation of the holders to bring the container into the required rotational orientation.

When required, further registered embossing tools may be provided at other stations on the reciprocating tool table. Besides or instead of embossing tooling, it is also known to provide one or more other tools at the tool stations on the reciprocating tool table, which shape the preform to an out-of-round transverse cross-sectional profile. In order to achieve the desired registered shaping, the preforms and/or these other tools must be suitably rotated relative to each other in the same way as described above for the registered embossing tools.

The orientation of the printing is determined by a sensor which detects at least one mark which is in predetermined register with the printing. The mark may be any mark capable of being sensed automatically by an appropriate sensor. Conveniently, it may be a printed or painted mark applied as part of the printing and therefore inherently consistently in register with it. Such a printed mark is optically sensed, and its position determined and used to control rotation of the or each embossing tool or the corresponding preform, as the case may be, for the proper alignment between the registered shaping tool(s) and the printing, needed to carry out the registered shaping. Where a single mark is used, the preform may be rotated until the mark is sensed, at which point the rotation is either stopped or, if necessary, continued through a predetermined fixed angle and then stopped, in both cases to bring the printing into the desired alignment with the registered shaping tool. In both cases the sensor is conveniently placed in or close to the rotation station in the necking machine. Alternatively, as disclosed in WO01/58618, the sensor may detect a uniquely coded mark in a series of such marks, which enables the orientation of the printing to be detected without rotating the preform relative to the sensor. The direction in which the tool or preform needs to be rotated through the smallest angle for registered shaping, and the size of that angle, can then be determined. This reduces the cycle time for acceptably accurate rotational positioning of the preform or tool. This is an important consideration because necking machines typically operate at speeds of up to 250 containers per minute, giving tool station cycle times of as little as 0.24 seconds. The coded mark sensor may be located in any suitable position in the necking machine, upstream of the rotation station where this is present, or upstream of the registered shaping station(s) otherwise. The sensor can be mounted on the tool table or on a fixed part of the necking machine, positioned to detect the coded markings on the preforms held in the rotary table.

Known registered shaping machines of these kinds can achieve alignment accuracies between the printing and the out-of-round selective deformation produced by the shaping tool, of within +/−4 degrees. While this is satisfactory for many applications, a higher registration accuracy is desirable, particularly in the case of containers provided with detailed printing and correspondingly fine or detailed embossing, in which registration errors are more noticeable.

A further limitation of existing registered shaping machines is that the size and the possible location of the selectively shaped region is somewhat restricted. The registered shaping tool is moved into and out of engagement with the preform by movement of the tool table axially of the preform, with the table being withdrawn between tool operations, to allow indexing of the preforms from station to station by movement of the rotary table. The stroke of the tool table is adapted primarily to the requirements of the necking tool array. This movement may be less than the depth of the preform, so that the registered shaping cannot be applied over the entire axial length of the preform, but is limited instead to those regions closest to the preform open end.

Also, the nature of known registered embossing tooling still limits the region on the preform where satisfactory registered embossing is possible and limits the form and size of the possible deformations. In WO01/58618, the embossing tooling comprises inner and outer forming tool (die) parts each mounted at the end of a resilient arm and urged respectively into inner and outer surfaces of the preform by cams. Complementary ones of the cams respectively engage a rearward shoulder of each inner forming tool part and a forward shoulder of each outer forming tool part, when the tool table moves to its extended, forward position. This moves the inner and outer tool parts into engagement with the preform in a pincer-like action. For debossing (as opposed to embossing), the inner forming tool parts support the non-deforming regions of the preform during deformation. Male portions of the outer forming tool parts then deform the wall of the preform into female portions of the inner forming tool parts. The opposite applies in the case of embossing, with male portions of the inner tool parts deforming the wall of the preform outwardly into female portions of the supporting outer forming tool parts. Where the axial length of the inner and outer forming tool parts is small, the forward and rearward engagement shoulders on these respective parts, together with the resilient mounting arms at their rearward ends, ensures that the pincer-like pressure applied to the preform is sufficiently even along the axial length of the co-operating forming tool parts for satisfactory registered embossing. However, where the axial extent of the forming tool parts is enlarged so as to cover a greater proportion of the length of the preform, controlling the evenness of the forming pressure and movements of the forming tool parts becomes increasingly difficult, without unacceptably increasing the stiffness of the resilient mounting arms. EP 1214991 discloses an embodiment of a registered embossing tool with inner and outer forming tool parts which co-operate with a pincer-like action, and a further embodiment in which an inner supporting tool is moved into and out of engagement with the preform by a pivoting arm, and an eccentrically mounted, rotary outer forming tool which co-operates with the inner supporting tool. U.S. Pat. No. 2,955,556 concerns an hydraulic press tool used in the manufacture of sheet metal cabinets, washing machine casings, electrical drier casings and other products of like nature, by expanding a welded cylinder of sheet metal. An expanding die mechanism includes so-called driver and driven die sections, all actuated by the same hydraulic cylinder. Outer dies surround the expanding die and are operated by one or more further hydraulic rams. One or more yet further hydraulic rams are used to load the sheet metal cylinder into, and unload it from, the tool. The entire tool is therefore large, heavy, and immobile; being supported at floor level and requiring stanchions extending below floor level to provide such support.

Increases in the range of positions on the preform where registered embossing is possible, and in the magnitude of the deformation achievable at positions within this range, are therefore desirable, with respect to the described prior art.

Accordingly, in a first independent aspect, the present invention provides a registered shaping machine comprising:

- a conveyor for carrying a series of preforms;
- a tool table having a plurality of tool stations between which the preforms are conveyed by indexed motion of the conveyor, the tool table being reciprocable along an axis towards and away from the conveyor, to bring forming tools at the tool stations into and out of operative engagement with the preforms;
- a registered shaping tool at at least one of the tool stations operatively arranged to deform the preforms to an out-of-round shape;
- at least one sensor operatively arranged to determine the angular orientation of each preform in a plane normal to the reciprocation axis;
- at least one reorientation actuator operatively arranged to cause relative rotation between each preform and the registered shaping tool, whereby the registered shaping tool and the preforms are brought into a predetermined relative angular orientation about an axis of the preform at the registered shaping tool station;
- the relative rotation with respect to a given preform taking place during a plurality of reciprocations of the tool table and/or indexing movements of the conveyor. In this way, more accurate alignment of the registered shaping tool is possible, within the time intervals allowed between reciprocations of the tool table/indexing movements of the conveyor.

The registered shaping machine may comprise at least two such reorientation actuators, one of which rotates the preform during one reciprocation of the tool table and/or during one indexing movement of the conveyor, and another of which rotates the preform during another reciprocation of the tool table and/or during another indexing movement of the conveyor. Additionally or alternatively the registered shaping machine may comprise at least one such reorientation actuator, the or each of which rotates a respective such registered shaping tool. In all of these arrangements, the relative rotational motion therefore can take place over a longer time interval. This entails lower maximum rotational speeds, lower angular momentum and lower accelerations/decelerations, which can reduce control errors such as overshoot/undershoot and drive element slippage.

The registered shaping machine may comprise at least two such sensors, with the relative rotation taking place initially to a first accuracy under the control of output from the first sensor, and then to a second accuracy higher than the first accuracy and under the control of output from the second sensor.

The sensor or sensors may be adapted to detect the position of a marker present in each preform. For a faster alignment between each preform and the registered shaping tool, the marker may comprise one in a series of unique physical markers, each individually identifiable by the sensor. The sensor or sensors may comprise an optical sensor and the marker a visible mark. The sensor or sensors may comprise a vision system such as a laser scanner, CCD array, electronic camera or the like but the invention is not restricted thereto.

The registered shaping machine may comprise a further sensor operatively arranged to determine the angular orientation of the preforms in a plane normal to the reciprocation axis after being relatively rotated to the second accuracy and to reject those of the preforms for which this determined angular orientation falls outside a predetermined range. Preforms which are inaccurately oriented for the registered shaping operation are thereby automatically rejected from the machine, e.g. before they reach the tooling.

The at least one reorientation actuator may comprise one or more actuators selected from any of the following types:

A. An actuator operatively arranged to reorient preforms prior to or as they are being loaded onto the conveyor, whereby the loaded preforms are carried by the conveyor in their reoriented state.

B. An actuator having a fixed portion mounted to a fixed part of the machine, the actuator being operatively arranged to reorient successive holders by which the preforms are carried by the conveyor.

C. An actuator comprising a series of actuators mounted to the conveyor and each operatively arranged to reorient a respective holder for carrying a respective one of the series of preforms on the conveyor.

D. An actuator comprising a series of actuators mounted to the conveyor and each operatively arranged to reorient a respective preform (either relative to or together with its holder).

E. An actuator having a fixed portion mounted to a fixed part of the machine, the actuator being operatively arranged to engage and reorient successive preforms on the conveyor (whether relative to or together with their holders) as the conveyor is indexed.

F. An actuator mounted to the tool table and operatively arranged to engage and reorient a successive preform with each reciprocation of the tool table.

G. An actuator operatively arranged to rotate the at least one registered shaping tool in the plane normal to the reciprocation axis.

These types of actuators may be used in any suitable combination, under the control of the outputs of the first and second sensors; for example as follows in Table 1, where "1" denotes control by the first sensor output and "2" denotes control by the second sensor output:

TABLE 1

| | | Actuator Types | | | | | | |
|---|---|---|---|---|---|---|---|---|
| | | A | B | C | D | E | F | G |
| Actuator | (i) | 1, 2[1] | | | | | | |
| combi- | (ii) | 1 | 2 | | | | | |
| nations | (iii) | 1 | | 2 | | | | |
| and | (iv) | 1 | | | 2 | | | |
| control | (v) | 1 | | | | 2 | | |
| arrange- | (vi) | 1 | | | | | 2 | |
| ments | (vii) | 1 | | | | | | 2 |
| | (viii) | | 1, 2[2] | | | | | |
| | (ix) | | 1 | 2 | | | | |
| | (x) | | 1 | | 2 | | | |
| | (xi) | | 1 | | | 2 | | |
| | (xii) | | 1 | | | | 2 | |
| | (xiii) | | 1 | | | | | 2 |
| | (xiv) | | | 1, 2 | | | | |
| | (xv) | | | 1 | 2 | | | |
| | (xvi) | | | 1 | | 2 | | |
| | (xvii) | | | 1 | | | 2 | |
| | (xviii) | | | 1 | | | | 2 |
| | (xix) | | | | 1, 2[3] | | | |
| | (xx) | | | | 1 | 2 | | |
| | (xxi) | | | | 1 | | 2 | |
| | (xxii) | | | | 1 | | | 2 |
| | (xxiii) | | | | | 1, 2 | | |
| | (xxiv) | | | | | 1 | 2 | |
| | (xxv) | | | | | 1 | | 2 |
| | (xxvi) | | | | | | 1, 2[4] | |
| | (xxvii) | | | | | | 1 | 2 |
| | (xxviii) | | | | | | | 1, |

[1] Two such actuators required, spaced apart by an integer multiple of the indexing displacement and controlled by the first and second sensor outputs, respectively.
[2] Two such actuators required, spaced apart by an integer multiple of the indexing displacement and controlled by the first and second sensor outputs, respectively.
[3] Two such actuators required, spaced apart by an integer multiple of the indexing displacement and controlled by the first and second sensor outputs, respectively.
[4] Two such actuators required, at different tool stations upstream of the registered deformation tool and controlled by the first and second sensor outputs, respectively.
[5] The two actuators may rotate the tool in two different indexing cycles of the conveyor. Only a single actuator may be provided for the tool, in which case the second sensor may also be omitted.

The invention correspondingly provides a method of deforming preforms using a registered shaping machine, comprising:

carrying the preforms in series on a conveyor;

reciprocating a tool table along an axis towards and away from the conveyor to bring forming tools at a plurality of tool stations on the tool table into and out of operative engagement with the preforms which are conveyed between the tool stations by indexed motion of the conveyor;

deforming the preforms to an out-of-round shape using a registered shaping tool located at one of the tool stations;

sensing the angular orientation of each preform in a plane normal to the axis of the preform using at least one sensor;

rotating each preform and the registered shaping tool relative to one another using at least one reorientation actuator, whereby the registered shaping tool and the preforms are brought into a predetermined relative angular orientation about an axis of the preform at the registered shaping tool station;

the relative rotation with respect to a given preform taking place during a plurality of reciprocations of the tool table and/or indexing movements of the conveyor.

The method may allow the shaping to be applied in a predetermined angular position on the preform to an accuracy of 3 degrees or better with a probability of at least 99%, preferably at least 99.9%, more preferably at least 99.98%.

The method may further comprise necking the deformed preforms to form a container body.

The method may further comprise packaging a group of at least 100 of the container bodies for despatch to a filling station.

The improved accuracy of registration allows consistent production runs of container bodies, all having registered shaping within significantly lower error tolerances than has hitherto been achievable using the prior registered shaping methods. Thus the invention correspondingly provides a packaged group of at least 100 contemporaneously or serially manufactured container bodies, each comprising a deformed portion at a predetermined angular position about an axis of the container body and measured relative to a marker on the container body, at least 98.0% of the container bodies having an error of less than 3 degrees in the position of their deformed portion relative to the marker.

In a second independent aspect, the present invention provides a tool for deforming a thin-walled tubular preform, comprising:

- an inner die insertable axially into the preform in an insertion direction;
- an outer die disposed opposite to the inner die;
- the inner and outer dies being movable towards one another so that the inserted inner die engages an inner surface of the preform wall and the outer die engages an outer surface of the preform wall;
- a first clamp mechanism which is operatively arranged to urge leading parts of inner die and outer die considered in the insertion direction, unyieldingly towards one another; and
- a second clamp mechanism which is operatively arranged to urge trailing parts of the inner die and outer die considered in the insertion direction, unyieldingly towards one another;
- so that the first and second clamp mechanisms constrain the inner and outer dies against tilting freely with respect to one another;
- in which the inner and outer dies are interconnected by a mechanism by which movement of the tool to surround the preform results in the movement of the inner and outer dies towards one another.

The mechanism interconnecting the inner and outer dies allows the tool to be operated by movement of a tool table, without the need for any further actuators. The tool can therefore be made compact enough and yet sufficiently robust to be fitted to the movable tool table of a registered shaping/necking machine, to provide versatile registered embossing/debossing of container preforms. For example, in the simplest case, the inner die moves outwardly while remaining parallel to the preform axis and the outer die moves inwardly while also remaining parallel to the preform axis. However, it is also possible for the inner die to move outwardly to a position in which it lies at an angle to the preform axis, and for the outer die to also move to a position in which it lies either parallel to or at an angle to the preform axis; this angle being the same or different to the angle of the inner die relative to the preform axis. In all cases, there is no freedom for unconstrained tilting movement of either the inner die or the outer die. On the other hand, a wide variety of deformations of the wall of the preform are possible between the co-operating inner and outer dies, repeatably and consistently applied over the entire length of the preform which is inserted between them.

The mechanism by which the inner and outer dies are interconnected may comprise:

- an inner actuating member;
- a holder relative to which the inner actuating member is movable in the insertion direction, the inner and outer dies being mounted to the holder so that they cannot move relative to the holder in the insertion direction but are free to move relative to the holder transverse to the insertion direction; and
- a frame/housing outward of the outer die and relative to which the holder is movable along the insertion direction.

The inner actuating member may comprise a draw bar whose movement is arrested by engagement with a machine frame as the tool is extended towards the preform.

Alternatively movement of the inner actuating member may be arrested by engagement of the inner actuating member with the preform or with apparatus in which the preform is held, as the tool is moved towards the preform.

Relative movement of the inner actuating member and the inner die may urge the inner die outwardly away from the preform axis.

Relative movement of the outer die and the frame/housing may urge the outer die inwardly towards the preform axis.

The first clamp mechanism may comprise:

- an inner portion by which movement of the inner actuating member relative to the holder in the direction counter to the insertion direction causes said leading part of the inner die (considered in the insertion direction) to be urged outwardly and unyieldingly away from the preform axis, and
- an outer portion by which movement of the holder relative to the frame/housing in the direction counter to the insertion direction causes said leading part of the outer die (considered in the insertion direction) to be urged inwardly and unyieldingly towards the preform axis.

Correspondingly, the second clamp mechanism may comprise:

- an inner portion by which movement of the inner actuating member relative to the holder in the direction counter to the insertion direction causes said trailing part of the inner die (considered in the insertion direction) to be urged outwardly and unyieldingly away from the preform axis, and
- an outer portion by which movement of the holder relative to the frame/housing in the direction counter to the insertion direction causes said trailing part of the outer die (considered in the insertion direction) to be urged inwardly and unyieldingly towards the preform axis.

The inner and outer mechanism portions may take any suitable form capable of providing the required motion conversion, e.g. relatively slidable wedge and cam surfaces; a pin and slot connection; a cam and cam follower roller; parallel, inclined racks and an intermediate toothed roller; a rack and eccentric sector gear; a 1-bar linkage, etc.

Alternatively the mechanism by which the inner and outer dies are interconnected may comprise:

- a holder to which the inner and outer dies are mounted so that they cannot move relative to the holder along the insertion direction but are free to move relative to the holder transverse to the insertion direction; and
- a frame/housing in which the holder is movable along the insertion direction and having an outer part outward of the outer die and an inner part inward of the inner die.

The holder may be connected to a draw bar whose movement is arrested by engagement with a machine frame as the tool is extended towards the preform.

Alternatively movement of the holder may be arrested by engagement of the holder with the preform or with apparatus in which the preform is held, as the tool is moved towards the preform.

Relative movement of the frame/housing inner part and the inner die may urge the inner die outwardly away from the preform axis.

Relative movement of the outer die and the frame/housing outer part may urge the outer die inwardly towards the preform axis.

In this case, the first clamp mechanism may comprise:

an inner portion by which relative movement of the frame/housing inner part past the inner die in the insertion direction causes said leading part of the inner die (considered in the insertion direction) to be urged outwardly and unyieldingly away from the preform axis, and an outer portion by which relative movement of the holder in the frame/housing in the insertion direction causes said leading part of the outer die (considered in the insertion direction) to be urged inwardly and unyieldingly towards the preform axis.

Correspondingly, the second clamp mechanism may comprise:

an inner portion by which relative movement of the frame/housing inner part past the inner die in the insertion direction causes said trailing part of the inner die (considered in the insertion direction) to be urged outwardly and unyieldingly away from the preform axis, and an outer portion by which relative movement of the holder in the frame/housing in the insertion direction causes said trailing part of the outer die (considered in the insertion direction) to be urged inwardly and unyieldingly towards the preform axis.

As before, the inner and outer mechanism portions may take any suitable form capable of providing the required motion conversion, e.g. relatively slidable wedge and cam surfaces; a pin and slot connection; a cam and cam follower roller; parallel, inclined racks and an intermediate toothed roller; a rack and eccentric sector gear; a 1-bar linkage, etc.

In any of these deforming tool arrangements, the frame/housing may be mounted to the tool table of an embossing or necking machine, either fixed to reciprocate with it, or mounted via an extensible actuator which has the effect of increasing the deforming tool stroke compared to the tool table stroke, thereby enabling longer/deeper deformation zones in the tubular preform.

The above and other preferred features and advantages of the invention are further explained below with reference to illustrative embodiments shown in the drawings, in which:

FIG. 1*a* shows a container preform to be operated upon in accordance with an embodiment of the invention;

FIG. 1*b* shows the preform of FIG. 1*a* after being operated upon to form a container body which has registered shaping in the form of embossed regions;

FIGS. 2*a*, 2*b* and 2*c* are front, side and top plan views of a container possessing another form of registered shaping;

Figure 8A:
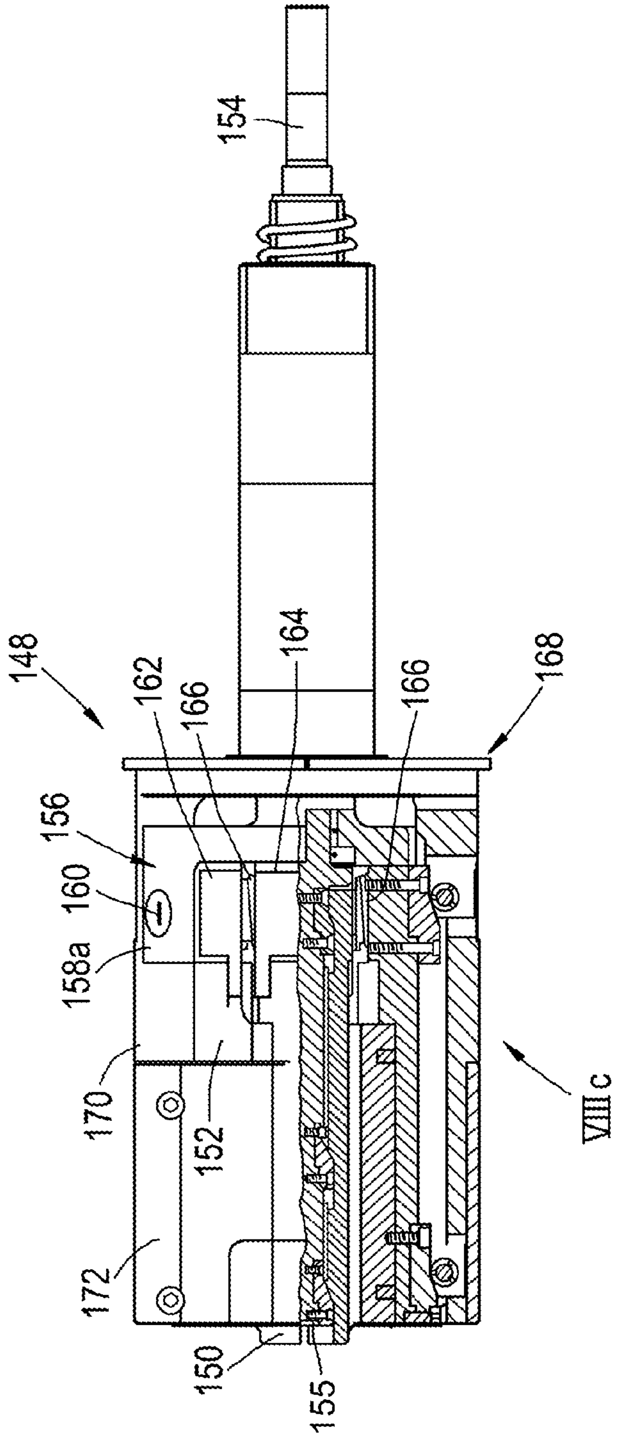
Figure 8B:
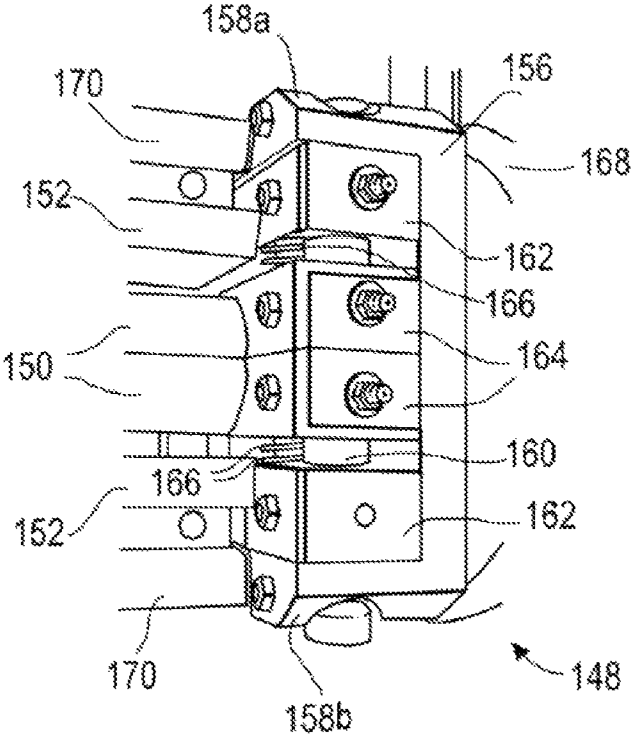
Figure 8C:
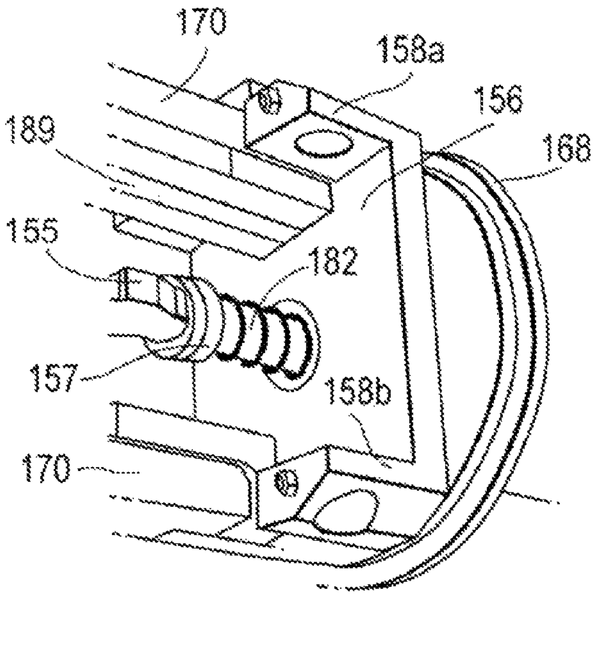
Figure 9:
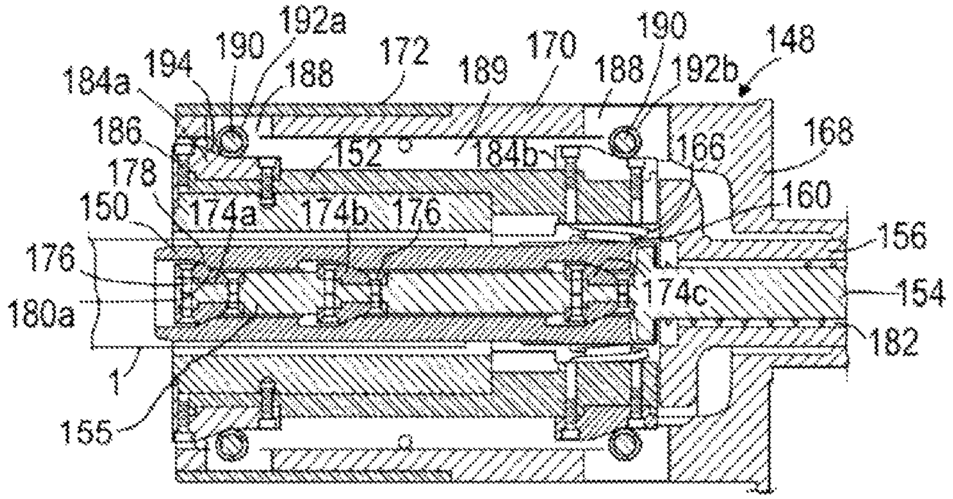
Figure 10:
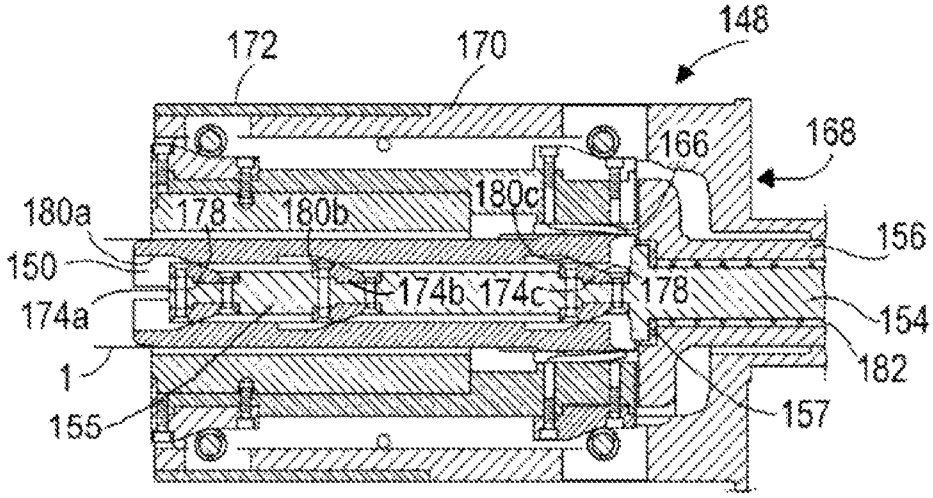
Figure 11:
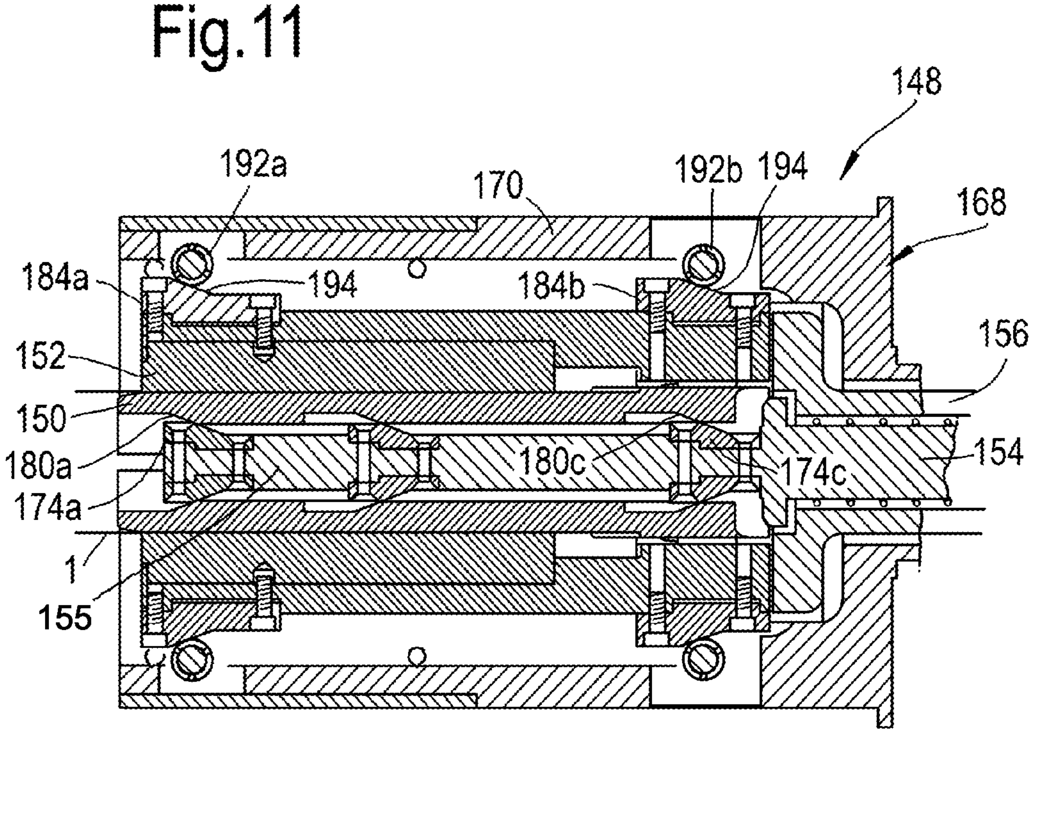

FIG. 8*a* is a part sectioned view of a registered embossing tool embodying the second aspect of the invention;

FIG. 8*b* is a perspective view of the tool of FIG. 8*a*, from the side shown in FIG. 8*a* and to the front, with certain parts omitted for clarity;

FIG. 8*c* is a perspective view on arrow VIIIc in FIG. 8*a*, with further parts omitted;

FIGS. 9, 10 and 11 illustrate successive stages in the operation of the tool of FIGS. 8*a* and 8*b;*

Figure 12:
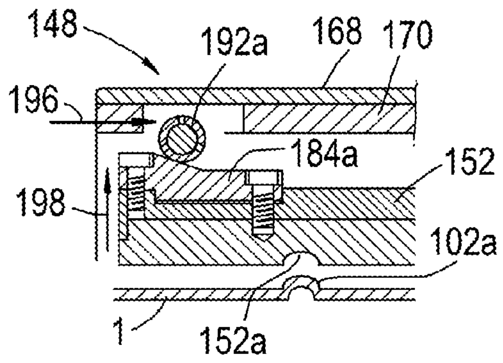
Figure 13:
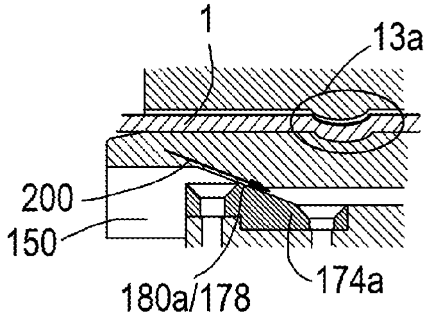
Figure 13A:
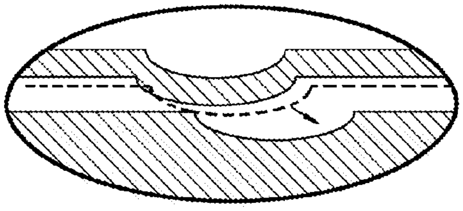
Figure 14:
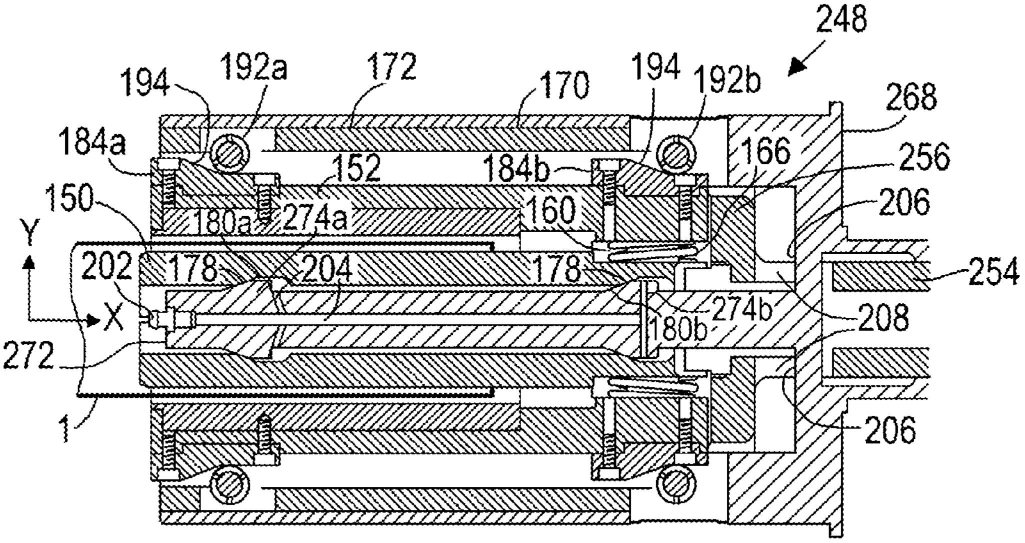
Figure 15:
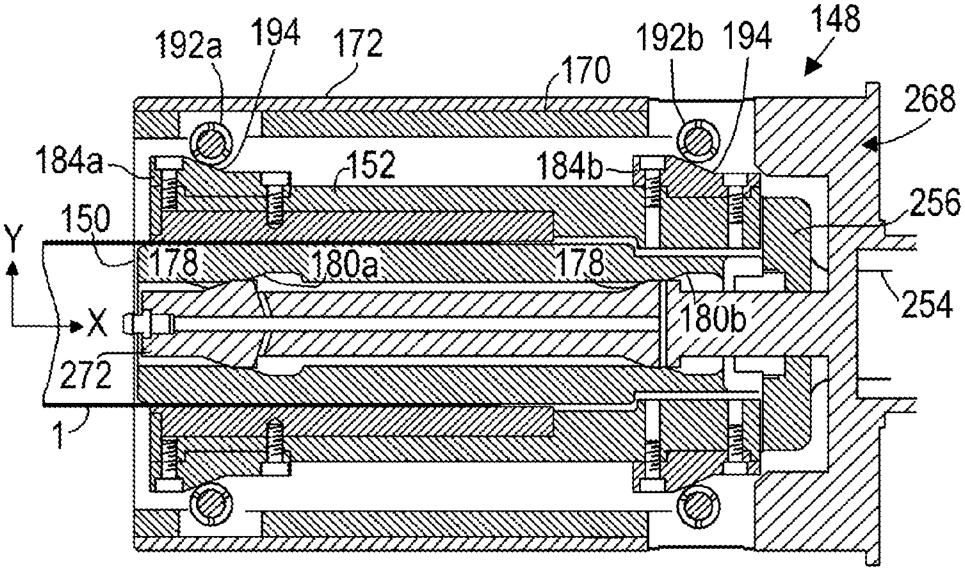
Figure 16:
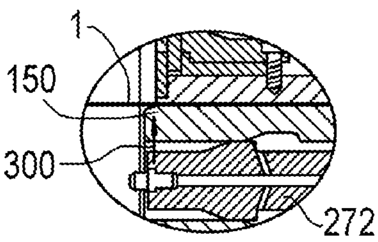
Figure 17:
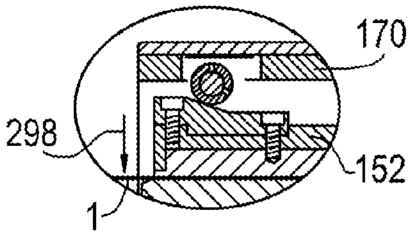
Figure 18:
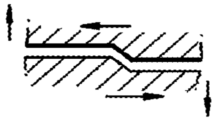
Figure 19:
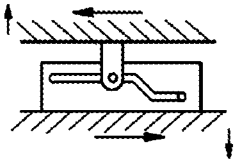
Figure 20:
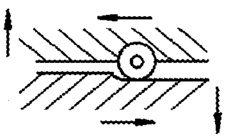
Figure 21:
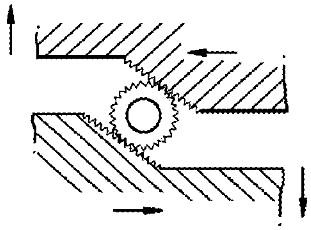
Figure 22:
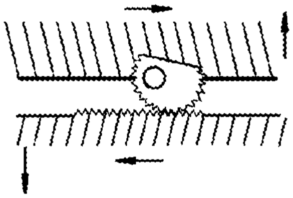

FIGS. 12 and 13 are detail views showing the direction of movement of components of the tool of FIGS. 8-11;

FIG. 13*a* is an enlargement of a portion of FIG. 13;

FIGS. 14 and 15 are cross-sectional views of a further embodiment of the registered embossing tool in different operative positions respectively;

FIGS. 16 and 17 are detail views showing the direction of movement of components of the tool of FIGS. 14 and 15;

FIGS. 18-23 schematically illustrate alternative component mechanisms which may be used in the tools of FIGS. 8-17, and FIGS. 24 and 25 diagrammatically illustrate the embossing/debossing capabilities of a tool according to one embodiment.

Figure 1A:
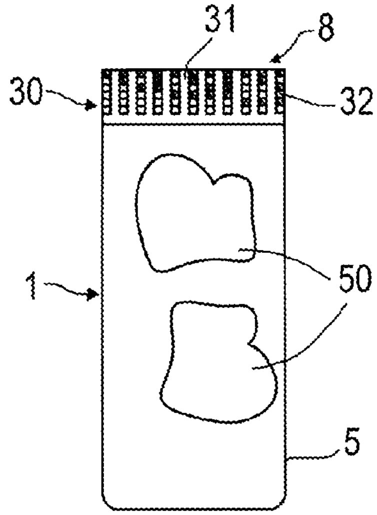
Figure 1B:
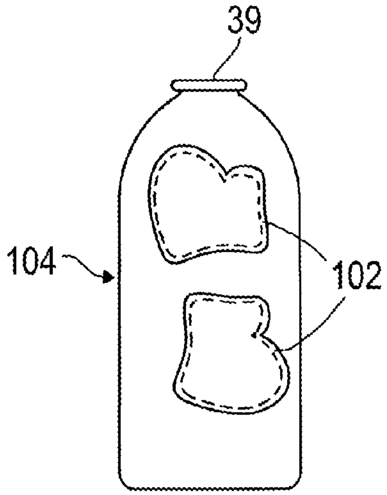
Figure 2A:
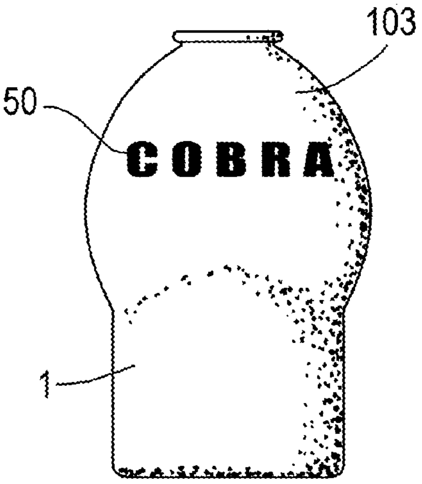
Figure 2B:
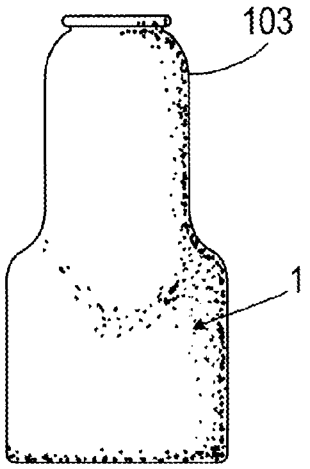
Figure 2C:
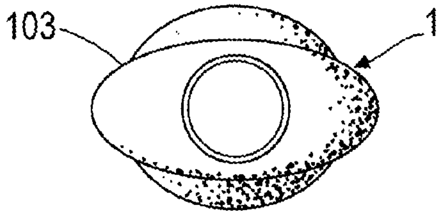
Figure 3:
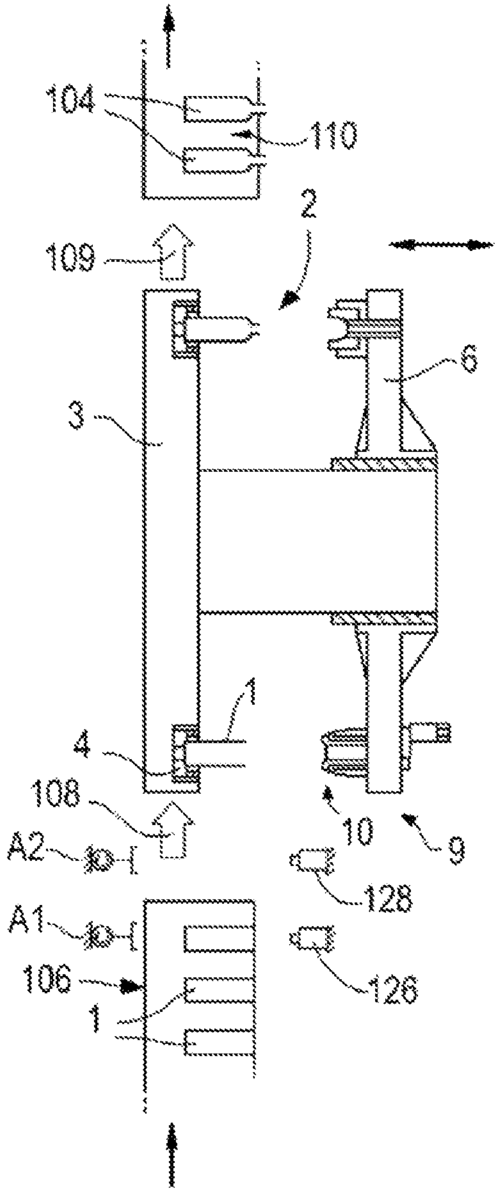
FIG. 3 is a schematic side view of apparatus in accordance with the invention.

Referring to the drawings, the apparatus and technique is directed to plastically deforming (cold forming, e.g. embossing or debossing, or other more general re-shaping to an out-of-round condition) the circumferential wall of a tubular preform 1 for a container ("can") made for example from aluminium alloy or the like, e.g. as shown in FIG. 1. The preform may be of monobloc construction, e.g. impact extruded from a round or oval billet or slug, or made by any other suitable method, such as DWI. In the non-limiting illustrative example shown, the re-shaping is to be carried out at a predetermined position relative to a pre-printed decorative design 50 on the external container wall. Where the selective shaping is intended to coincide with the printed decorative design, this is referred to in the art as Registered Shaping. In the embodiment shown in FIGS. 1*a* and 1*b*, the registered shaping consists of embossing 102, which is to be carried out closely coincident with but slightly inside the borders of a lithographically printed design 50 of arbitrary shape. Further embossed areas or other out-of-round shaping may or may not be provided, which may or may not be coincident with other pre-painted or pre-printed areas of the container preform's outer surface. For aesthetic reasons it is important that the location at which the design 102 is embossed is coordinated with the printed design 50 on the container body 104 wall. More generally, a need can arise for co-ordination between printing or like surface features of the preform and any form of out-of-round shaping. Coordination of the preform 1 axial rotational orientation with the tooling orientation to effect deformation is therefore important. FIGS. 2*a*-2*c* show by way of a non-limiting illustrative example, a container 1 whose upper part 103 has been deformed to a somewhat flattened or generally elliptical cross-section, e.g. using static tooling as described below. The flattened part 103 is again angularly aligned so that a pre-printed design 50 is centred within a front face (or otherwise formed in predetermined registration with out-of-round shaping). These are particular illustrative and non-limiting examples of registered shaping. Many other instances, with other out-of-round forms, other locations of out-of-round forms (e.g. more towards or close to the base of the container body) and combinations of out-of-round forms, involving registered embossing, other registered shaping, or both, are also possible.

Referring to FIGS. 3 to 6, container forming apparatus 2 comprises a conveyor provided by a (typically vertically orientated) rotary table 3 operated to rotate about a (horizontal) axis in an indexed fashion to successively rotationally advanced locations. Spaced around the periphery of table 3 are a series of container holding stations comprising holding chucks 4. Container preforms 1 are delivered in sequence to the rotary table from an infeed conveyor 106 via transfer apparatus 108, each preform base being received in a respective holder or chuck 4. The chucks hold the bases of the containers sufficiently firmly to retain them in position on the rotary table 3 for the subsequent shaping operations as described below.

A vertically orientated tool table 6 faces the rotary table 3 and carries a series of deformation tools at spaced tooling stations 7. With each successive rotary step or indexing movement of rotary table 3, tool table 6 is moved horizontally from a retracted position (FIG. 3) to an advanced position (FIG. 6) and back again. In moving to the advanced position the respective tools 11 at tooling stations 7 perform forming operations on the preform circumferential walls proximate their respective open ends 8. Successive tooling stations 7 perform successive degrees of deformation in the process. This process is well known, being used in the prior art to form a partially closed top end to the container, opposite to the base 5, and frequently known as necking. Various neck/shoulder profiles such as that shown for the container body 104 in FIG. 3 can be produced. The mouth of the container typically is also shaped to form a seat 39 for a subsequently fitted dispensing valve or other closure or fitment.

Typically a majority of the tools 11 have preform shaping parts which are fixed to the tool table. This is therefore known as "static tooling" (despite the movement of the tool table, and the fact that such tools may have other moving parts). When operating upon oriented preforms, such static tooling may be appropriately configured to produce registered out-of-round deformation, i.e. registered shaping; again optionally performed in successive stages by a number of successive tools 11. The oval flattening 103 at the top of the container 1 shown in FIGS. 2*a*-2*c* is an example of such registered shaping. In a less preferred alternative, the tools involved in registered shaping may be rotated independently about the corresponding preform axis, to provide at least part of the required registration between the tool concerned and each preform.

Some tools 11 at one or more of the tooling stations 7 may have relatively moving parts, such as orbital rollers for smoothing circumferential regions of the preform, or for forming circumferential grooves or shoulders. Edge trimming tools with moving parts may also be provided.

Figure 5:
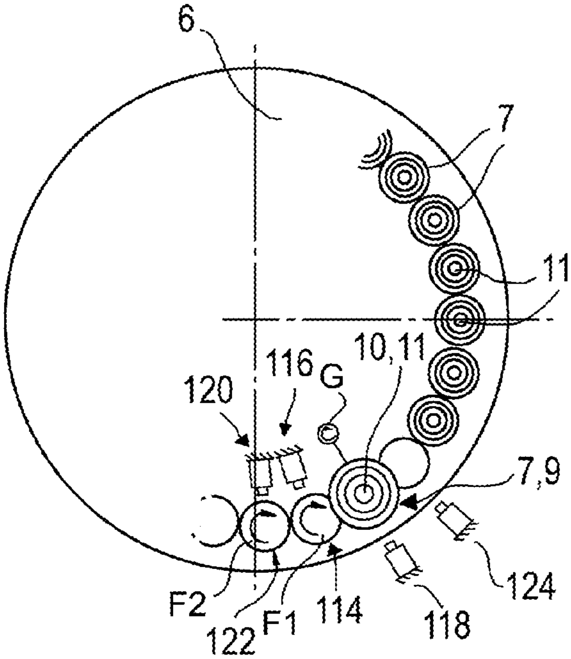
Figure 6:
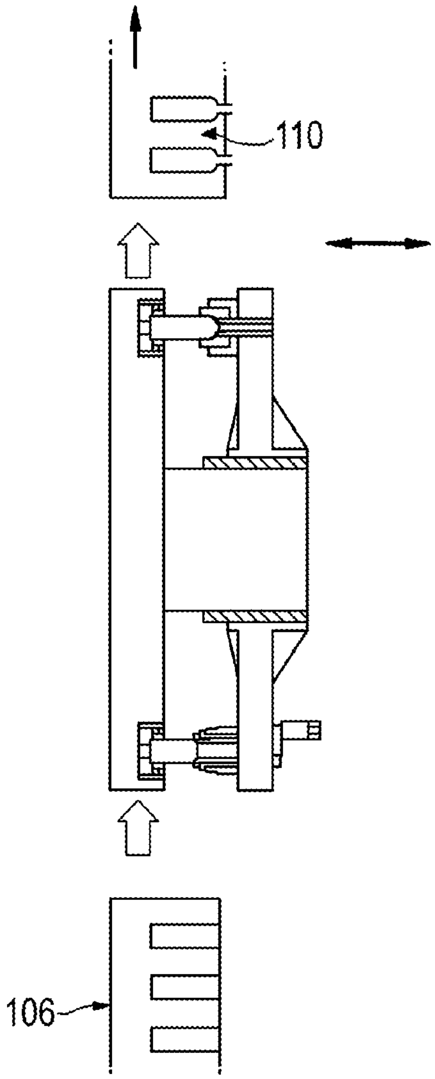
FIG. 6 is a view corresponding to FIG. 3, but with apparatus components shown in a different operational position.

Some tools 11 at one or more of the tooling stations 7 (e.g. the station also referenced 9) may be registered embossing tools (also referenced 10 in the illustrative example of FIG. 5). A registered embossing tool typically comprises relatively movable parts: a male die to perform the embossing/debossing deformation and a complementary female die to support the undeformed areas of the preform adjacent to the areas being deformed, and having recesses into which the deformed portions of the preform are displaced. Usually, a given registered embossing tool will perform a complete embossing operation (i.e. fully deform the material of the container preform to the required final position). A number of registered embossing tools may be provided e.g. which operate on different regions of the preform wall at different indexing steps of the conveyor (rotary table) 3. A given embossing tool optionally may have more than one set of co-operating male/female dies, so that it may deform more than one region (e.g. two opposed regions) of the preform simultaneously. The registered embossing tools 10 may or may not be rotatable about the corresponding preform axis, to provide at least part of the required registration with the preform.

After all shaping operations are complete, the fully formed containers leave the container forming apparatus 2 via transfer device 109 and a takeaway conveyor 110, leading e.g. to a packing line or a filling line.

Container forming apparatus typically operates at speeds of up to 250 containers per minute giving a typical working time duration at each forming station in the order of 0.24 seconds. In this time, it is required that the tool table 6 moves axially to the advanced position (see FIG. 6), the tooling at a respective station contacts a respective container and deforms one stage in the deformation process, and the tool table 6 is retracted.

Prior to the engagement of the registered embossing tooling or any other registered shaping tooling 11 with a container 1 carried by the table 3, it is important that the container 1 and the tooling concerned are accurately rotationally oriented to ensure that the embossed pattern 102 and/or any other registered shaping such as 103 are accurately positioned with respect to the printed design 50 on the exterior of the container.

This accuracy is improved by carrying out the relative reorientation process over two or more reciprocations of the tool table 6 and/or two or more indexing steps of the rotary table 3 or equivalent conveyor. Registration accuracy may be further improved by checking the position of a respective preform on two (or more) separate occasions prior to operation of the registered embossing tooling 10 or other registered shaping tooling 11. On each occasion, the angular orientation of the preform in the plane normal to the tool table movement axis is checked automatically, and the tooling 11 or the preform 1 or both are then rotated automatically so as to bring the tooling and the printed design 50 into closer registration. The rotation immediately following the first orientation check may bring the tooling and printed design 50 into approximate angular alignment so that, typically, the amount of further rotational movement required to bring the preform 1 and the tooling into close alignment following the second orientation check, is small. Lower rotational speeds, accelerations and decelerations are therefore needed to effect this further rotational movement within the cycle times available during indexing of the rotary table (conveyor) 3 and movement of the tool table 6. This is particularly the case if the two orientation checks and corresponding angular alignment movements take place during successive indexing movements of the rotary table 3 (and thus in successive reciprocation cycles of the tool table 6). Improved alignment accuracy results, as maximum speeds, accelerations and angular momentums are lower, so there is less likelihood of orientation actuator positional overshoot/undershoot, or of significant slippage between the reorientation mechanism and the container (or the registered shaping tool, if applicable).

If desired, further checks and reorientations may be performed similarly on further successive indexing movements of the rotary table (conveyor) 3, for even finer alignment between the registered shaping tooling 11 and the printed design 50. However two separate checking and alignment stages may be adequate in many cases. Following the final realignment and prior to operation of the registered shaping tooling, the orientation of the preform 1 can be checked again a final time, to review whether it is within a permitted tolerance. Out of tolerance preforms can then be rejected.

Figure 7:
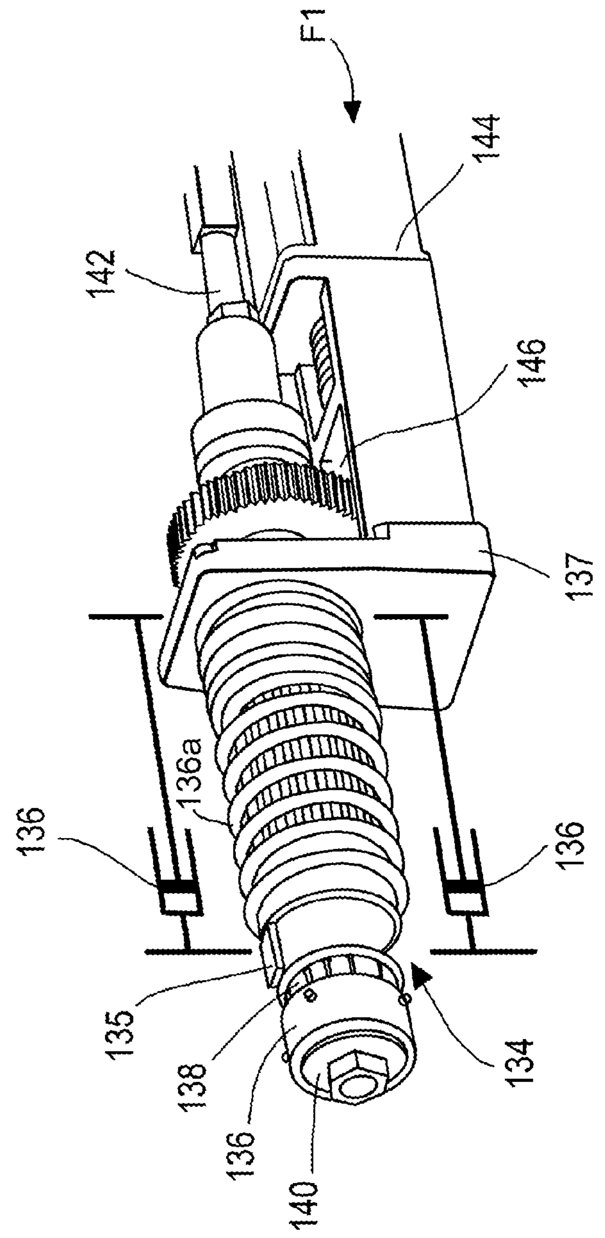
FIG. 7 is a perspective view of a reorientation actuator which may be used in embodiments of the present invention.

The first reorientation of the preform 1 relative to the registered shaping tool 11 can conveniently be carried out by a dedicated reorientation actuator F1 (FIG. 5) carried by the tool table 6, at a reorientation station 114 upstream of the embossing tool station 9 (or of any other registered shaping station). The reorientation actuator F1 is shown in more detail in FIG. 7. It comprises an expandable mandrel 134 which is inserted inside the mouth of the preform 1 at the reorientation station 114 by movement of the tool table 6 to the advanced position, whilst the preform 1 is already held in a chuck 4 of the rotary table 3. The mandrel comprises a collet having radially expandable fingers 138. The fingers have part-conical, internal wedge surfaces (not shown) which co-operate with a conical wedge 140 carried by a draw bar 142. Somewhat before the tool table 6 reaches the fully advanced position shown in FIG. 6, the collet 134 enters the mouth of the preform 1 and the draw bar engages the machine frame. At this point the conical wedge 140 engages the internal wedge surfaces of the collet fingers 138, causing them to expand into gripping engagement inside the preform mouth. The reorientation actuator F1 has a rearward portion 137 mounted to the tool table 6. The mandrel 134 is mounted in a bearing sleeve 135 which is axially movable relative to the rearward portion 137 (and tool table) by a number of pneumatic actuators 136. These take up the remaining movement of the tool table as it moves to its most advanced position. Additionally or alternatively this movement may be taken up by a bias/return spring 136*a*. The collet therefore remains in the same axial position when engaged within the preform mouth. During this time interval the mandrel 134 is rotatable by a motor 144 and a pinion gear 146. Thus when the preform is internally gripped by the expanded mandrel, the corresponding holder or chuck 4 is released (if required); to the extent necessary to permit rotation of the container about its axis. (In fact the holder or chuck 4 may grip the container sufficiently lightly to permit the container to be turned in it without releasing the holder at all. Likewise the holders or chucks 4 may be rotationally mounted to the rotary table 3 or similar conveyor, the rotational mountings being yieldingly frictionally braked). The motor 144 can then be operated to angularly reorient the mandrel 134 and engaged preform 1 by the desired amount. The chuck 4 can then be re-engaged if necessary. All of this takes place within the dwell time available while the actuators 136 take up the further advancement of the tool table 6 to its fully advanced position. When the tool table retracts, the mandrel 134 collapses and is withdrawn from the mouth of the reoriented preform. The actuators 136 (where present) and return bias spring 136*a* are then extended again for the next cycle of the reorientation actuator. The reorientation actuator F1 is relatively small and has a low moment of inertia, which assists in accelerating and decelerating it and the engaged preform 1 rapidly for movement into the desired angular position by the motor 144. Other motor or actuator types may be used to perform the angular rotation. Any other suitable reorientation actuator mechanism may be used. For example instead of using a draw bar 142 or the like and wedge 140 to expand the collet, a drive collet may have radially outwardly resiliently biased fingers drivingly engageable inside the preform. These fingers may be constrained against outward movement by a collar which normally is forwardly biased over the fingers. On advancement of the tool table, the collar encounters the container neck and is pushed back along the fingers, allowing the collet to expand into driving engagement inside the container. Other components of this reorientation actuator mechanism may be similar to those described above with reference to FIG. 7. The reorientation actuator may take any other suitable form. For example, it may be pneumatically or electro-pneumatically operated, including not only for the rotary motion, but also for the required driving engagement/disengagement to/from the preform.

The second reorientation of the preform 1 relative to the registered shaping tooling 11 can conveniently be carried out by rotationally reorienting the tooling 11 to the required position using a reorientation actuator G (FIG. 5) which is drivingly coupled between the tool table 6 and the tool(s) 11 concerned. This technique is particularly convenient and advantageous in the case of a single step registered shaping such as using a registered embossing tool 10, because a rotational drive of only one further arrangement (the embossing tool 10) is required. This tooling, although having a higher moment of inertia than the reorientation tool F1, does not have to move as far, and so can achieve the required accurate reorientation of the tool within the available cycle times. The technique is less convenient in the case of multi-step registered shaping, where the corresponding sequence of registered shaping tools (some or all of the tools 11, as required) will have to be individually reoriented with each indexing step of the rotary table (conveyor) 3, to match the previously sensed orientations of the preforms currently being presented to them. For example these orientations may be passed along a shift register in the machine control system, with sequential memories corresponding to the sequence of registered shaping tool stations.

The orientation of the preforms at the station 114 prior to reorientation (first orientation check) can be sensed by a camera or other suitable sensor 116, carried by the tool table 6 or fixed to the machine frame adjacent to tool station 114. The preform's orientation for moving the registered embossing (or other registered shaping) tool(s) into more accurate alignment with it in the second reorientation (second reorientation check) can be sensed by a further camera or other suitable sensor 118, carried by the tool table 6 or fixed to the machine frame adjacent to the first registered shaping station, e.g. registered embossing tool station 9. The chucks 4 can be fixed relative to the table 3 and receive containers in random axial rotational orientations. Moving parts for the apparatus are therefore minimised in number, and reliability of the apparatus is optimised. This reorientation scheme corresponds to actuator combination and control arrangement (xxvii) in Table 1 above.

Other reorientation schemes are also feasible, for example including the others shown in Table 1. In arrangement (xxvi) in Table 1, the reorientation actuator(s) G and sensor 118 are omitted, and another reorientation actuator F2 and corresponding sensor 120, are added to the tool table at station 122, upstream of station 114. The two reorientation actuators F1, F2 are in this case similar, except that optionally the gear ratio and/or step angle of the motor is lower in the case of F1 compared to F2, to permit finer (but lower speed) angular adjustment. Similarly, the resolution of sensor 116 (and/or angular displacement determination methodology, see below) may be more accurate than for sensor 120. No reorientation of registered shaping tooling is required, so this scheme is equally convenient for a multi-step (multi-tool) registered shaping process as it is for a single step process.

In arrangement (xxviii), two separate cameras or other suitable sensors 118, 124 control the movement of the reorientation actuator(s) G, which may be a single actuator as schematically shown in FIG. 5, or a pair of actuators (not shown), each one of which is controlled individually by a respective one of the sensors 118, 124. Alternatively, only a single reorientation actuator G and only a single sensor 124 may be used, but which are operative to reorient the tool 11 over the course of two or more reciprocations of the tool table 6 and/or two or more indexing movements of the rotary table 3 or like conveyor.

In arrangement (i), rather than the previously described reorientation actuators and cameras/sensors, a first reorientation actuator A1 (FIG. 3) reorients the preforms 1 leaving the infeed conveyor 106, immediately following a first orientation check carried out by a suitably positioned camera/sensor 126. A second reorientation actuator A2 then reorients the preforms 1 in the transfer apparatus 108, following a second orientation check carried out by a suitably positioned camera/sensor 128. In arrangement (ii), reorientation actuator A1 and camera/sensor 126 are not used. Camera/sensor 128 performs the first orientation check and the reorientation actuator A2 performs the immediately following first reorientation. A camera/sensor 130 mounted to the machine frame provides the second orientation check, once the preforms are held in the chucks 4 on rotary table 3 (see FIG. 4). A reorientation actuator B1 mounted to the machine frame reorients each successive passing chuck 4 to provide the second reorientation, the chucks otherwise being locked to the table 3 or otherwise constrained against relative rotation (e.g. by friction). In arrangement (iii), the actuator B1 is replaced by a series of dedicated reorientation actuators C mounted to the rotary table (conveyor) 3, each arranged to rotate a respective one of the chucks 4 about the axis of its preform, the chucks 4 otherwise being constrained against rotation. Arrangement (iv) is similar, except the actuators D engage and rotate the preforms (relative to or together with their chucks 4). In arrangement (v), the actuators C are replaced by a single reorientation actuator E, mounted to the machine frame and which directly engages the preforms 1, rather than engaging the chucks 4. The chucks 4 if necessary are therefore sufficiently released during such engagement, to permit reorientation to take place. In arrangement (vi), the actuator E is replaced by a reorientation actuator on the tool table, such as F1 or F2 (FIG. 5). In arrangement (vii), the actuator F1/F2 is replaced by registered embossing (or other registered shaping) tool reorientation actuator(s) G.

Figure 4:
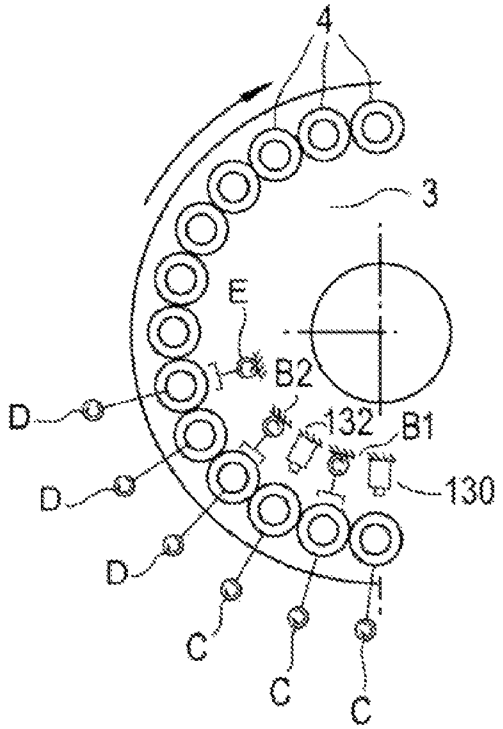
FIGS. 4 and 5 are half plan views of apparatus components of FIG. 5.

Arrangement (viii) uses Type B actuators, e.g. B1, B2, FIG. 4, to perform the first and second reorientations as a given preform is indexed past the two actuators in succession; the first and second orientation checks being performed by corresponding cameras/sensors 130, 132. Arrangement (xiv) uses each Type C actuator twice on a given preform 1, after respective first and second orientation checks, e.g. using camera sensors such as 130, 132. Similarly arrangement (xix) uses two Type D actuators under the control of respective cameras/sensors positioned to carry out the immediately preceding orientation checks. The remaining reorientation actuator type combinations, control arrangements, and feasible camera/sensor positions can be readily determined from Table 1 in conjunction with FIGS. 3-5 and the preceding description.

The open ends 8 of undeformed container preforms 1 approaching the apparatus 2 have margins 30 printed with a coded marking band 31 (FIG. 1*a*) comprising a series of spaced code blocks or strings 32. Each code block/string 32 comprises a column of e.g. seven data point zones coloured dark or light according to a predetermined sequence (see FIG. 1 and WO01/58618, particularly FIG. 4 thereof and the accompanying description—six zones being described there).

To perform either the first or the second orientation checks, a suitably positioned electronic camera 60 views a portion of the code in its field of view. The data corresponding to the viewed code is compared with the data stored in a memory (e.g. of a machine controller, not shown) for the coded band and the position of the preform relative to a datum position is ascertained. The degree of rotational realignment required for the registered shaping (e.g. embossing) tooling 10 to conform to the datum for the respective preform is stored in the memory. The controller then instigates rotational repositioning of the preform 1 (or the tooling 10, 11, where applicable), using the corresponding actuator, to ensure that deformation occurs at the correct zone on the circumferential surface of the preform 1. The controller when assessing the angular position of the tooling relative to the angular position to be deformed on the preform utilises a decision making routine to decide whether clockwise or counterclockwise rotation of the preform 1 (or tooling 10/11, if a Type G actuator is concerned) provides the shortest route to the datum position, and initiates the required sense of rotation of the reorientation actuator accordingly. This is an important feature of the system in enabling rotation of the preform or tooling to be effected in a short enough time-frame to be accommodated within the indexing interval of the rotating table 3.

The coding block 32 system is in effect a binary code and provides that the camera device can accurately and clearly read the code and determine the position of the preform relative to the tooling 10 datum by viewing a small proportion of the code only (for example two adjacent blocks 32 can have a large number of unique coded configurations). The coding blocks 32 are made up of vertical data point strings (perpendicular to the direction of extent of the coding band 31) in each of which there are dark and light data point zones (squares). Each vertical block 32 contains e.g. seven data point zones. This arrangement has benefits over a conventional bar code arrangement, particularly in an industrial environment where there may be variation in light intensity, mechanical vibrations and the like.

The coding band 31 can be conveniently printed contemporaneously with the printing of the design 50 on the exterior of the preform 1. Forming of the neck feature 39 preferably obscures the coding band from view in the finished product.

When performing the first orientation check, lower accuracy is required than when performing the second orientation check. For the first check the controller may simply determine the coding block which is closest to a datum point (e.g. the centre point along the movement axis in the field of view). The controller may then rotate the preform 1 through the number of angular increments between adjacent coding blocks that would be required to bring that coding block into view closest to the datum point, which corresponds to the correct orientation for registered embossing to take place. (Rotation taking place in the direction of shortest travel to bring about such registration, as explained above). Optionally, the fraction of the inter-block angular increment that the closest block lies away from the datum point prior to rotation, (negative for fractions behind the datum point, positive for fractions beyond the datum point) is determined and added to the calculated number of angular increments. For the second orientation check, the controller may simply check that the expected coding block lies closest to the datum point, and then rotate the preform (or embossing tool 10, if applicable) through the required fraction of the inter-block angular increment to bring the expected coding block to the datum position. If the expected coding block is not found to be closest to the datum point at the beginning of the second orientation check, the required number of inter-block increments has to be added to the fractional increment. A final registration error of less than +/−1 mm, or less than 3 degrees, or even less than +/−0.5 mm, 1.5 degrees can be consistently achieved by these methods and equipment.

An alternative to the optical, panoramic visual sensing of the coding band 31, could be to use an alternative visual mark, or a physical mark (e.g. a deformation or hole in the container wall or an irregularity in the container rim) to be physically sensed.

FIGS. 8a-11 show a tool 148 embodying the second aspect of the invention, for deforming a thin-walled tubular preform, such as an aluminium alloy preform for a container body. The tool may be used to carry out a registered embossing operation or other out-of-round shaping of the preform, accurately and reliably, in a wide variety of locations on the side wall of the preform, including deep within the preform relative to an insertion end.

The illustrated tool 148 comprises two sets of dies for performing the embossing/debossing/shaping operations at two diametrically opposed locations on the preform. More or fewer sets of dies may be provided, engageable with the preform at spaced locations around its circumference, as dictated by particular shaping requirements. The construction and operation of each set of dies is generally similar, so for brevity the following description is mainly confined to one set only. Each die set consists of an inner die 150 and outer die 152, each having a working face patterned with the profile corresponding to the shape that is to be imparted to the preform.

The tool 148 further comprises a draw bar 154 running axially through its centre, coupled to or comprising an inner actuating member 155. A holder 156 is provided, through which the inner actuating member 155 is movable along the same axis along which the preform is inserted into the tool. (In fact, in use the preform 1 is generally held stationary, and the tool is moved to engulf the preform, so here "inserted" and "movable" are used in a relative sense). The holder 156 comprises an upper pair of longitudinally projecting arms 158a, disposed symmetrically on either side of a centre plane of the tool 148 (the plane of the page in FIG. 8a). Only one of these arms 158a (that closest to the viewer) is therefore visible in FIGS. 8a-8c. The holder comprises a pair of lower arms 158b, which (as seen in FIGS. 8b and 8c) mirror the upper arms 158a on the opposite (lower) side of the draw bar 154, but neither of which are visible in the part-sectioned drawing of FIG. 8a. A parallel pair of vertical guide rods 160 are supported between respective ones of the upper 158a and lower arms 158b, to either side of the inner actuating member 155 (the upper end of the front guide rod where it is exposed in the arm 158 being visible in FIG. 8a). The outer die 152 has a pair of guide ears 162 each with a through hole which is a close sliding fit over a respective one of the guide rods 160. Similarly, the inner die 150 has a pair of guide ears 164 each with a through hole which is a close sliding fit over the guide rods 160. A pair of bias springs 166 is fitted between each set of guide ears 160 and 162 so as to bias the inner and outer dies 150, 152 away from each other, towards an expanded, open position. A frame/housing 168 has a pair of longitudinal beams 170 which each respectively extend outwardly of each of the outer dies 152. The holder 156 is slidable in the frame/housing, longitudinally of the inner actuating member 155. The upper arms 158a have respective opposed surfaces which slide along the sides of the upper beam 170 so as to prevent rotation of the holder 156 in the frame/housing 168. Likewise the lower arms 158b have respective opposed surfaces which slide along the sides of the lower beam 170. The leading ends of the outer dies 152 (to the left in FIG. 8a) are also received for guided sliding movement between opposed guide blocks 172 (removed in FIGS. 8b and 8c), which are bolted to the leading end of the beam 170 so as to form a structural part of the frame/housing 168. In FIG. 8c the inner actuating member 155 is shown exposed by removal of the dies 150, 152, springs 166 and guide rods 160. The holder 156 and its arms 158a, 158b can also be more clearly seen. In FIG. 8c the inner actuating member 155 is shown rotated 90 degrees about its longitudinal axis, compared to its normal operating position.

FIG. 9 shows a central, longitudinal cross-section through the tool 148, in a condition in which it is fully inserted into/around a preform 1, but in which the inner and outer dies have not yet been actuated to engage the preform 1. The inner actuating member 155 has a set of three wedges 174a, 174b, 174c spaced along its length and secured to it by machine screws 176. Each wedge provides a cam surface 178 inclined outwardly in the insertion direction at the same angle. The inner die 150 is formed with three internal pockets each of which defines a correspondingly inclined bearing surface 180a-c in engagement with the cam surface 178 of the corresponding wedge 174a-c. The wedges 174a-c are made from a material that is compatible with that of the inner die (e.g. tool steel) to form a slide bearing. The holder 156 is biased counter to the insertion direction relative to the draw bar 154 and inner actuating member 155, by a return spring 182. The outer die 152 has a leading wedge block 184a and a trailing wedge block 184b secured to its outer surface by machine screws 186. The beam 170 of the frame/housing 168 is formed with a pair of internal pockets 188 spanned by transverse bearing pins 190, on which a leading roller 192a and a trailing roller 192b are journalled respectively. These rollers co-operate with surfaces 194 on the wedge blocks 184a, 184b which are each inclined outwardly in the insertion direction at the same angle. The wedge blocks are received in grooves 189 formed in the inner sides of the beams 170 and which extend between the pockets 188. In the position shown in FIG. 9, inner actuating member 155 has moved together with the holder 156 and the frame/housing 168 so that the inner die 150 is fully inserted into the preform 1 and the outer die 152 lies adjacent to the corresponding outer surface region of the preform 1. At this point, the draw bar engages the machine frame and together with the inner actuating member 155 stops moving; whereas the holder 156 and frame/housing 168 continue to move in the insertion direction (to the left in FIG. 9). For example, the frame/housing may be directly mounted to a tool table (not shown) movable in the insertion direction, or mounted to such a tool table via a linear actuator which extends in the insertion direction so as to amplify the stroke of the tool table.

As shown in FIG. 10, as all components of the deforming tool 148 apart from the inner actuating member 155 continue to move to the left in the insertion direction, the inclined bearing surfaces 180a-c of the inner die 150 ride forwardly in the insertion direction and outwardly along the cam surfaces 178 of the wedges 174a-c. The entire inner die 150 therefore moves outwardly and in the insertion direction, guided by the cam surfaces 178.

Because such cam surfaces are unyielding and provided both at a leading part of the inner die (by wedge 174a) and at a trailing part of the inner die (by wedge 174c), the inner die is not free to rotate, but is instead constrained to move (translate) in a trajectory parallel to the surfaces 178/180a-c without rotation or tilting; also guided on the guide rods 160 via the ears 162. The inner die continues to move in this way until it meets the inner wall of the preform 1. During such movement, the bias springs 166 are compressed.

Once the inner die 150 contacts the wall of the preform 1, further outward movement is constrained. Continued movement of the holder 156 relative to the inner actuating member 155 would therefore be resisted by the engaged cam and bearing surfaces 178/180*a-c*. However, to prevent any undesired straining of the preform 1 by the engaged inner dies 150, further forward movement of the holder 156 on the inner actuating member 155 is arrested by a shim washer 157 engageable between co-operating stop shoulders on the draw bar 154 and holder 156.

At the same time as the inner dies are being moved outwardly by the engaged cam and bearing surfaces 178/180*a-c*, the rollers 192*a* and 192*b* press inwardly upon the outer dies 152 via the inclined surfaces 194. The roller 192*b* therefore overcomes the resistance of the bias springs 166, and the rollers 192*a*, 192*b* begin to travel along the inclined surfaces 194 of the wedge blocks 184*a*, 184*b*, as shown in FIG. 11. When the movement of the holder 156 on the inner actuating member 155 is arrested by the shim washer 157, the rollers 192*a*, 192*b* push against the inclined surfaces 194 and drive the outer dies 152 perpendicularly inwards towards the preform 1. The leading part of each outer die 152 (the left end as illustrated), is driven unyieldingly inwards by the roller 192*a* and the inclined surface 194 of wedge block 184*a*, and the trailing part of each outer die is driven unyieldingly inwards by the roller 192*b* and the inclined surface 194 of the wedge block 184*b*. Therefore the outer die 152 is not free for unconstrained rotation, but is instead constrained to move (translate) in a trajectory perpendicular to the insertion direction, without rotation or tilting, also guided on the guide rods 160 by the ears 162. The inner and outer dies 150, 152 therefore close together on the wall of the preform 1, sandwiching it with a predictable and consistent final position. Therefore precision deformation of each successive preform 1 to the desired shape is achievable, even when the area deformed is extensive and/or comprises a portion located far away from the end of the preform into which the tool is inserted. The roller 192*a*, wedge block 184*a*, bearing surface 180*a* and wedge block 174*a* together form a first unyielding clamping mechanism for the leading parts of the inner and outer dies 150, 152, urging them towards one another. Similarly, the roller 192*b*, wedge block 184*b*, bearing surface 180*c* and wedge block 174*c* form a second unyielding clamping mechanism for the trailing parts of the inner and outer dies 150, 152, urging them towards one another.

FIG. 12 shows the direction of movement of the frame/housing 168 opposite to the insertion direction, as the tool 148 begins to be withdrawn from the preform (arrow 196). The resultant perpendicular movement of the outer die (arrow 198) is also shown. This perpendicular movement results in a clean separation of the outer die from the preform 1 and faithful reproduction of any embossments 102*a* on the outer surface of the preform 1 by the corresponding female parts 152*a* of the outer die 152 (and likewise faithful reproduction of debossments by outer die male parts). Movement of the tool table or actuator withdraws the frame/housing 168 from around the shaped and/or embossed preform 1, and also withdraws the inner actuating member 155, holder 156 and dies 150, 152.

FIG. 13 correspondingly shows the direction of movement of the inner die 150 (arrow 200) as it collapses along cam surface 178. As this motion has both an axial and a transverse component, the trailing edges of steep debossments (or the leading edges of sharp embossments) can become “smudged” or “blurred” by the corresponding female (or male in the case of embossments) parts of the inner die 150. This is shown most clearly in FIG. 13*a*. While in some cases this does not matter, as the inner profile of the preform is not seen by the consumer, in the extreme this can also affect the outer profile of the finished container and/or lead to an undesirable thinning of the preform wall and/or damage to protective lacquer within the preform.

FIGS. 14-17 show a further tool 248 embodying the second aspect of the invention, in which both the inner and outer dies move perpendicularly to the insertion direction, so that the “blurring” effect referred to above does not occur. This tool nevertheless still has many similarities with the tool 148 described above with reference to FIGS. 8-13*a*. Like references are used to denote like parts. The corresponding description above should therefore be consulted for a detailed description of those parts. The most significant differences with respect to the previously described tool are as follows.

The holder 256 is fixed to the end of the draw bar 254, these two parts preferably being integrally formed as a single component, as shown in FIGS. 14 and 15. The frame/housing 268 therefore slides directly on the draw bar 254 in the insertion direction. This end of the draw bar 254 is hollow. The inner actuating member 155 as shown in FIGS. 9-11 is replaced by a central beam 272 (frame/housing inner part) which extends to the inside of the inner die 150 in place of the inner actuating member 155. Central beam 272 is fixedly mounted within (e.g. integrally formed in one piece with) the remainder of the frame/housing 268 and has a free end pointing in the insertion direction. This free end has a grease nipple 202 leading to lubrication passageways 204. The opposite end of the central beam 272 is connected to the remainder of the frame/housing 268 by mounting spokes 206 which pass through windows 208 in the hollow end of the draw bar 254.

The wedge blocks 174*a*, 174*c* are optionally replaced by lands 274*a*, 274*c* integrally formed with the central beam 272, to provide the cam surfaces 178. Wedge block 174*b* may be similarly replaced, or omitted entirely (together with the corresponding inner die pocket and bearing surface 180*b*).

Operation of the tool 268 is as follows. When the draw bar 254 has grounded on the machine frame, advancement of it, the carrier 256 and the attached dies 150, 152 in the insertion direction, ceases. At this point, the inner die 150 is fully inserted into the preform 1 and the outer die 152 lies next to the corresponding outer surface of the preform 1. The dies at this point are held open and out of contact with the preform by the bias springs 166. As shown in FIG. 15, continued advancement of the frame/housing 268 (including beams 172, 272) causes the rollers 192*a*, 192*b* to move along the inclined surfaces 194 of cam blocks 184*a*, 184*b*, forcing the outer die 152 to move inwardly, without any freedom to rotate or tilt, as described above with respect to FIGS. 8*a*-11. The inward movement is perpendicular to the insertion direction, as described above (see also arrow 298, FIG. 17).

Because at this point the carrier 256 has ceased to advance, continued advancement of the central beam or frame/housing inner part 272 together with the rest of the frame/housing 268 causes the inner die 150 to move perpendicularly outward along the guide rods 160 (see arrow 300, FIG. 16). The inner die bearing surfaces 180*a*, 180*b* push against the central beam cam surfaces 178 on the lands 274*a*, 274*b*, so that the inner die 150 moves outwardly against the bias of the springs 166 and into contact with the inner wall of the preform 1. In doing so, the inner die 150 once again is constrained to move without any possibility of free tilting motion, so that its motion is entirely predictable and consistent for each embossing cycle, as described above with reference to FIG. 11. During their closing and opening movement against the wall of the preform 1, the inner and outer dies are again guided on the guide rods 160.

The sequence in which the inner and outer dies 150, 152 first begin to move is dictated by the order in which on the one hand the rollers 192*a*, 192*b* encounter the inclined surfaces 194 and on the other hand the bearing surfaces 180*a*, 180*c* encounter the cam surfaces 178. Appropriate timings can be obtained by suitably adjusting the relative positions of these components along the insertion direction. For example for a debossing operation, it may be preferable to first position the inner die against the inner surface of the preform to support the preform wall (apart from at the female areas of the inner die). The outer die can then be closed against the outer surface of the preform so that the male parts of the outer die impinge on the preform wall and displace it into the female parts of the inner die. Due to the support provided by the inner die, the deformation of the preform wall will then be confined substantially to the male/female die parts, producing clean and precise embossments. On the other hand for an embossing operation, by the same logic, it may be preferable to position the outer die in contact with the preform wall before contacting the preform with the inner die.

Figure 23:
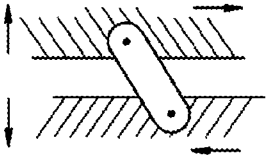

In any of the tool arrangements described with reference to FIGS. 8-17, conversion of relative motion in the insertion direction between:

- the inner actuating member and the inner die leading part
- the inner actuating member and the inner die trailing part
- the central beam and the inner die leading part, or
- the central beam and the inner die trailing part into motion of the inner die transverse to the insertion direction;

or conversion of relative motion in the insertion direction between:

- the outer beam (or an equivalent part of the frame/housing) and the outer die leading part, or
- the outer beam (or an equivalent part of the frame/housing) and the outer die trailing part into motion of the outer die transverse to the insertion direction, may each be performed by any known mechanism which is mechanically equivalent to those specifically described above, and which is suitable as regards space constraints and robustness. Suitable mechanisms may include:

- relatively slidable wedge and cam surfaces (FIG. 18);
- a pin and slot connection (FIG. 19);
- a cam and cam follower roller (FIG. 20);
- parallel, inclined racks and an intermediate toothed roller (FIG. 21);
- a rack and eccentric sector gear (FIG. 22);
- a 1-bar linkage (FIG. 23).

The draw bar 154 may be omitted from the arrangement shown in FIGS. 8*a*-11 and similar arrangements. Instead, forward motion of the inner actuating member 155 may be arrested in use of the tool by the inner actuating member encountering a portion (e.g. the rim or base) of the preform 1, or encountering a suitable stop provided on the apparatus in which the preform is held. Likewise, the drawbar may be omitted from the arrangement shown in FIGS. 14, 15 and similar arrangements. Instead, forward motion of the carrier 256 may be arrested in use of the tool by the inner actuating member encountering a portion (e.g. the rim or base) of the preform 1, or encountering a suitable stop provided on the apparatus in which the preform is held. Rather than being operated by motion of the tool table, the inner actuating member 155 and the carrier 256 may be moved by a suitable pneumatic actuator or other linear motor/solenoid.

The inner and outer dies may be coupled to move with the holder 156, 256 in the insertion/withdrawal direction of the tool by any suitable mechanical coupling which leaves them free to move in the transverse direction, thereby closing upon the preform wall and opening again. The guide ears 162, 164 may for example be replaced by guide blocks formed as separate components to the respective dies 150, 152. These guide blocks slide on the pairs of guide rods 160 or slide in or on any other suitable guide track(s) provided in or on the holder 156. The dies 150, 152 may for example comprise yokes by which they are secured to trunnions on the guide blocks, or comprise another similar hinged connection; in each case providing a pivot axis orthogonal to the plane of movement of the dies. The springs 166 or another suitable resilient biasing element or elements may then be arranged to act between the inner and outer dies, rather than between the guide blocks or the like. Thus, the different ends of a given die may move transversely by different amounts under the action of the first and second unyielding clamp mechanisms respectively. Likewise the leading end (or trailing end) of one die may move transversely by a different amount than the co-operating end of the other die. In this way it is possible to deform a thin-walled tubular preform to a wider variety of shapes than has previously been the case. Such angular movement may also assist in manoeuvring the inner dies into a non-cylindrical (e.g. previously registered shaped) preform. Hence it is possible to use the tool to emboss/deboss preform walls which have already been formed to a non-cylindrical shape. For example, flared, tapered, convex and concave profiles may be produced both in the circumferential and axial directions of the tubular preform, or at any orientation in between. Such profile shaping may be carried out instead of or as well as embossing or debossing, either in registration with patterns painted, printed or otherwise applied to the exterior surface of the preform, or not.

Figure 24:
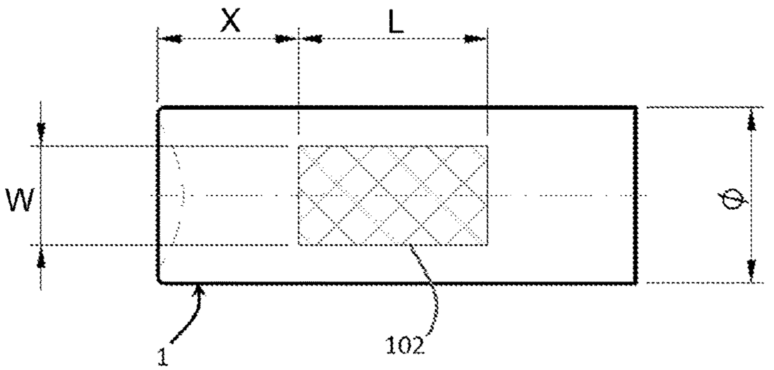
Figure 25:
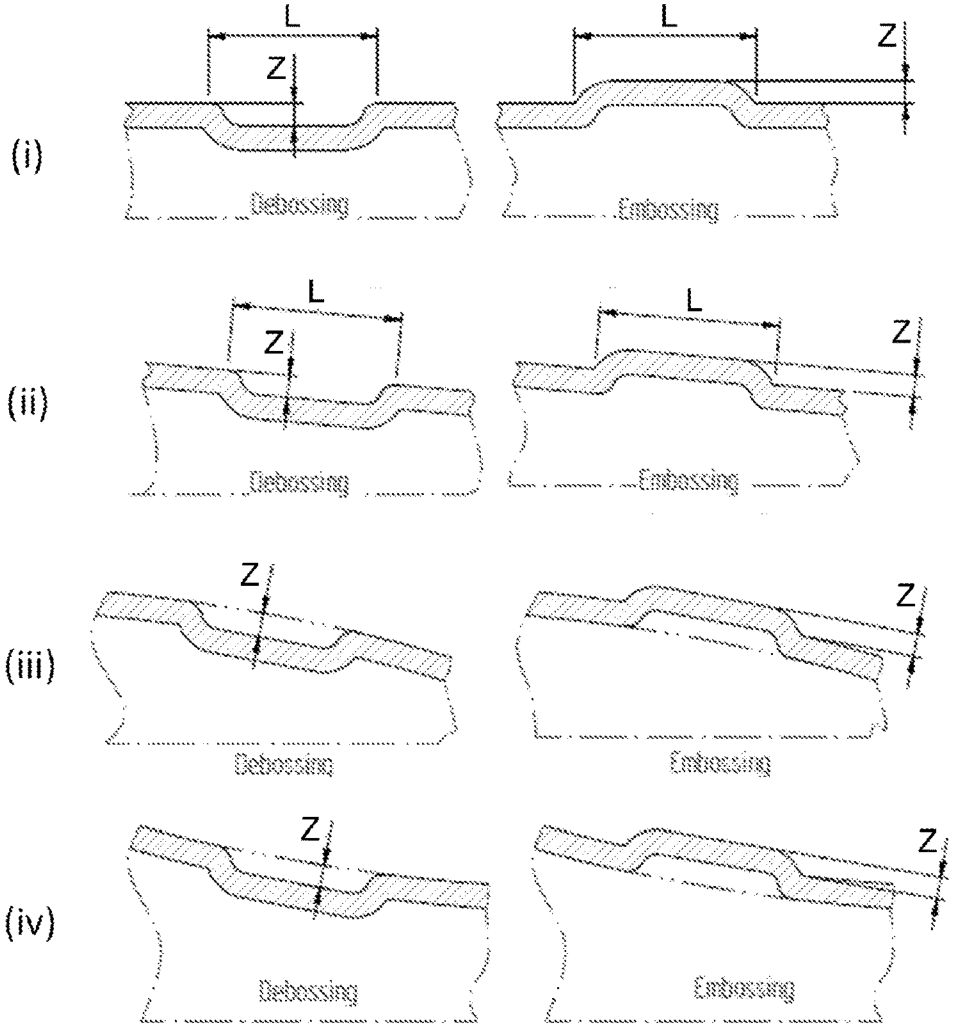

As illustrated diagrammatically in FIGS. 24 and 25, debossing and embossing tools according to some embodiments (including but not limited to those of FIGS. 8*a*-17) are capable of producing individual registered embossed/debossed regions 102 in the side wall of a container preform 1 having a diameter p (internal or external) of approximately 30-70 mm, a deformation height or depth Z of over 0.3 mm, e.g. 0.5 mm, and even up to approximately 1.25 mm; a region axial dimension L of over 100 mm, e.g. 150 mm or 200 mm, even up to approximately 250 mm; a spacing X from the bottom (closed) end of the preform as little as approximately 20 mm, optionally less than 17 mm, optionally less than 15 mm; and a region dimension W in the circumferential direction of the side wall of more than 25 mm, e.g. 30 mm or 40 mm, even up to approximately 50 mm. Within this region there may be a single embossed/debossed feature, or many individual embossed/debossed features, such as, without limitation, ribs, chevrons, waves, circles, curves, other geometrical or arbitrary shapes and/or patterning, decal or shield like areas, letters/numbers/symbols, crests, trade marks and combinations of such features. The preform may have a cylindrical side wall thickness of between 0.15 and 0.6 mm. As well as operating upon cylindrical preform surfaces (FIG. 25 panel (i)), these tools are also capable of embossing/debossing flared or frusto-conical preform surfaces (panel (ii)), convex preform surfaces (panel (iii)) and concave preform surfaces (panel (iv)). The tools of such embodiments are capable of achieving general dimensional tolerances of 0.5 mm.

The invention claimed is:

1. A tool for a necking machine, for use in forming a container body from a preform, the tool comprising:

an inner die insertable through the rim of the preform in an insertion direction towards the base of the preform;

an outer die disposed opposite to the inner die;

the inner and outer dies being movable towards one another so that the inserted inner die engages an inner surface of a wall of the preform and the outer die engages an outer surface of the wall of the preform;

a first clamp mechanism which is operatively arranged to urge leading parts of inner die and outer die considered in the insertion direction, unyieldingly towards one another; and a second clamp mechanism which is operatively arranged to urge trailing parts of the inner die and outer die considered in the insertion direction, unyieldingly towards one another;

so that the first and second clamp mechanisms constrain the inner and outer dies against tilting freely with respect to one another;

in which the inner and outer dies are interconnected by a mechanism by which movement of the tool in the insertion direction results in the movement of the inner and outer dies towards one another.

2. The tool of claim 1, in which the mechanism by which the inner and outer dies are interconnected comprises:

an inner actuating member;

a holder relative to which the inner actuating member is movable in the insertion direction, the inner and outer dies being mounted to the holder so that they cannot move relative to the holder in the insertion direction but are free to move relative to the holder transverse to the insertion direction; and a frame/housing outward of the outer die and relative to which the holder is movable along the insertion direction.

3. The tool of claim 2, in which the inner actuating member comprises a draw bar whose movement is arrested by engagement with a machine frame as the tool is moved in the insertion direction.

4. The tool of claim 2, in which movement of the inner actuating member is arrested by engagement of the inner actuating member with the preform or with apparatus in which the preform is held, as the tool is moved in the insertion direction.

5. The tool of claim 2, in which relative movement of the inner actuating member and the inner die urges the inner die outwardly towards the inner surface of the wall of the preform.

6. The tool of claim 2, in which relative movement of the outer die and the frame/housing urges the outer die inwardly towards the outer surface of the wall of the preform.

7. The tool of claim 2, in which the first clamp mechanism comprises: an inner portion by which movement of the inner actuating member relative to the holder in the direction counter to the insertion direction causes said leading part of the inner die to be urged outwardly and unyieldingly towards the inner surface of the wall of the preform, and an outer portion by which movement of the holder relative to the frame/housing in the direction counter to the insertion direction causes said leading part of the outer die to be urged inwardly and unyieldingly towards the outer surface of the wall of the preform.

8. The tool of claim 7, in which the second clamp mechanism comprises:

an inner portion by which movement of the inner actuating member relative to the holder in the direction counter to the insertion direction causes said trailing part of the inner die to be urged outwardly and unyieldingly towards the inner surface of the wall of the preform, and an outer portion by which movement of the holder relative to the frame/housing in the direction counter to the insertion direction causes said trailing part of the outer die to be urged inwardly and unyieldingly towards the outer surface of the wall of the preform.

9. The tool of claim 8, in which the inner and outer mechanism portions are selected from a group consisting of:

relatively slidable wedge and cam surfaces; a pin and slot connection; a cam and cam follower roller; parallel, inclined racks and an intermediate toothed roller; a rack and eccentric sector gear;

and a 1-bar linkage.

10. The tool of claim 1, in which the mechanism by which the inner and outer dies are interconnected comprises:

a holder to which the inner and outer dies are mounted so that they cannot move relative to the holder along the insertion direction but are free to move relative to the holder transverse to the insertion direction; and a frame/housing in which the holder is movable along the insertion direction and having an outer part outward of the outer die and an inner part inward of the inner die.

11. The tool of claim 10, in which the holder is connected to a draw bar whose movement is arrested by engagement with a machine frame as the tool is moved in the insertion direction.

12. The tool of claim 10, in which movement of the holder is arrested by engagement of the holder with the preform or with apparatus in which the preform is held, as the tool is moved towards the preform.

13. The tool of claim 10, in which relative movement of the frame/housing inner part and the inner die urges the inner die outwardly towards the inner surface of the wall of the preform.

14. The tool of claim 10, in which relative movement of the outer die and the frame/housing outer part urges the outer die inwardly towards the outer surface of the wall of the preform.

15. The tool of claim 10, in which the first clamp mechanism comprises:

an inner portion by which relative movement of the frame/housing inner part past the inner die in the insertion direction causes said leading part of the inner die to be urged outwardly and unyieldingly towards the inner surface of the wall of the preform, and an outer portion by which relative movement of the holder in the frame/housing in the insertion direction causes said leading part of the outer die to be urged inwardly and unyieldingly towards the outer surface of the wall of the preform.

16. The tool of claim 15, in which the second clamp mechanism comprises:

an inner portion by which relative movement of the frame/housing inner part past the inner die in the insertion direction causes said trailing part of the inner die to be urged outwardly and unyieldingly towards the inner surface of the wall of the preform, and an outer portion by which relative movement of the holder in the frame/housing in the insertion direction causes said trailing part of the outer die to be urged inwardly and unyieldingly towards the outer surface of the wall of the preform.

17. The tool of claim 16, in which the inner and outer mechanism portions are selected from a group consisting of:

relatively slidable wedge and cam surfaces; a pin and slot connection; a cam and cam follower roller; parallel, inclined racks and an intermediate toothed roller; a rack and eccentric sector gear;

and a 1-bar linkage.

18. The tool of claim 1, in which the tool frame/housing is fixed to reciprocate with a tool table of the necking machine.

19. The tool of claim 1, in which the tool frame/housing is mounted to the tool table of the necking machine, via an extensible actuator.

20. A method of forming a container body from a preform using a tool in a necking machine, the tool comprising an inner die and an outer die, the preform comprising a rim, a base, and a wall extending between the rim and the base and having an inner surface and an outer surface, the method comprising:

inserting the inner die through the rim of the preform in an insertion direction towards the base of the preform;

disposing the outer die opposite to the inner die;

moving the inner and outer dies towards one another so that the inserted inner die engages the inner surface of the wall of the preform and the outer die engages the outer surface of the wall of the preform;

operating a first clamp mechanism to urge leading parts of inner die and outer die considered in the insertion direction, unyieldingly towards one another; and operating a second clamp mechanism to urge trailing parts of the inner die and outer die considered in the insertion direction, unyieldingly towards one another so that the first and second clamp mechanisms constrain the inner and outer dies against tilting freely with respect to one another;

the inner and outer dies being operatively interconnected so that the movement of the tool in the insertion direction results in the movement of the inner and outer dies towards one another.

21. A container body comprising:

(i) a base, (ii) a rim opposite to the base; and (iii) an embossed or debossed region extending from at or below the rim towards the base, wherein the embossed or debossed region is formed using the method of claim 20 and extends to more than 100 mm below the rim towards the base.

22. The container body of claim 21, wherein the embossed or debossed region extends to more than 150 mm below the rim towards the base.

23. The container body of claim 21, wherein the embossed or debossed region extends to more than 200 mm below the rim towards the base.

24. The container body of claim 21, wherein the embossed or debossed region extends up to 250 mm below the rim towards the base.

25. The container body of claim 21, wherein the preform is generally cylindrical prior to the forming in the necking machine.

26. The container body of claim 25, wherein the preform has a diameter of 30-70 mm prior to the forming the embossed or debossed region.

27. The container body of claim 21, wherein the preform has a side wall thickness of between 0.15 and 0.6 mm prior to forming the embossed or debossed region.

28. The container body of claim 21, wherein the embossment or debossment has a depth greater than 0.3 mm.

29. The container body of claim 21, wherein the embossment or debossment has a depth greater than 0.5 mm.

30. The container body of claim 21, wherein the embossment or debossment has a depth of up to 1.25 mm.

31. The container body of claim 21, wherein the embossed or debossed region has a dimension in a circumferential direction of the body of more than 25 mm.

32. The container body of claim 21, wherein the embossed or debossed region has a dimension in a circumferential direction of the body of more than 30 mm.

33. The container body of claim 21, wherein the embossed or debossed region has a dimension in a circumferential direction of the body of more than 40 mm.

34. The container body of claim 21, wherein the embossed or debossed region has a dimension in a circumferential direction of the body of up to 50 mm.

35. The container body of claim 21, wherein the embossed or debossed region is provided on a generally convex, generally concave, or generally flared or frusto-conical surface region of the container body.

* * * * *